US012528010B2

(12) United States Patent
Maher et al.

(10) Patent No.: US 12,528,010 B2
(45) Date of Patent: Jan. 20, 2026

(54) SEQUENTIAL SHIFTER

(71) Applicant: Logitech Europe S.A., Lausanne (CH)

(72) Inventors: David Maher, Limerick (IE); Andrew Kelly, Hertfordshire (GB); Simon Baumgartner, Cork (IE); Cheng Hao Chiu, Hsinchu (TW); Baptiste Merminod, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 267 days.

(21) Appl. No.: 18/497,542

(22) Filed: Oct. 30, 2023

(65) Prior Publication Data

US 2025/0135331 A1    May 1, 2025

(51) Int. Cl.
*A63F 13/245*    (2014.01)

(52) U.S. Cl.
CPC ................. *A63F 13/245* (2014.09)

(58) Field of Classification Search
CPC ........ A63F 13/24; A63F 13/245; A63F 13/90; A63F 13/92; A63F 13/98; A63F 13/803
See application file for complete search history.

(56) References Cited

U.S. PATENT DOCUMENTS

| | | | | | |
|---|---|---|---|---|---|
| 4,148,014 A | * | 4/1979 | Burson | .................. | G05G 9/047 345/161 |
| 4,306,208 A | * | 12/1981 | Coors | ................ | G05G 9/04785 336/136 |
| 4,479,038 A | * | 10/1984 | Marhold | ............ | G05G 9/04785 345/161 |
| 4,538,035 A | * | 8/1985 | Pool | .................... | G05G 9/04785 200/557 |
| 4,855,704 A | * | 8/1989 | Betz | ....................... | G05G 9/047 341/20 |
| 5,003,799 A | * | 4/1991 | Imai | ........................ | F16H 59/10 70/252 |
| 5,436,640 A | * | 7/1995 | Reeves | .................. | G05G 9/047 345/161 |
| 5,532,476 A | * | 7/1996 | Mikan | ...................... | G01D 5/30 250/221 |
| 5,559,432 A | * | 9/1996 | Logue | .................... | B82Y 15/00 345/161 |
| 5,680,796 A | * | 10/1997 | Wustenberg | ............ | G06F 3/033 74/471 XY |
| 5,847,694 A | * | 12/1998 | Redford | ................... | G01D 5/26 345/161 |

(Continued)

*Primary Examiner* — Chase E Leichliter
(74) *Attorney, Agent, or Firm* — Kilpatrick Townsend & Stockton LLP

(57) ABSTRACT

Dual-function input devices for a computing device may include a housing and an actuator disposed within the housing. The actuator may be pivotable relative to the housing in a first direction and a second direction. The actuator may include a first connector and a second connector. The input devices may include an input lever that is coupleable with the actuator via one of the first connector and the second connector. The actuator may be configurable between a first mode by coupling the input lever with the first connector and a second mode by coupling the input lever with the second connector. In the first mode the input lever and the actuator may be pivotable in the first direction by a first distance. In the second mode the input lever and the actuator may be pivotable in the first direction by a second distance that is greater than the first distance.

20 Claims, 14 Drawing Sheets

(56) References Cited

U.S. PATENT DOCUMENTS

| | | | | |
|---|---|---|---|---|
| 5,868,620 | A * | 2/1999 | Wada | A63F 13/422 |
| | | | | 463/38 |
| 6,029,537 | A * | 2/2000 | Nagao | G05G 9/047 |
| | | | | 74/471 XY |
| 6,083,106 | A * | 7/2000 | McDowell | A63F 13/803 |
| | | | | 463/6 |
| 6,109,130 | A * | 8/2000 | Will | B66F 9/20 |
| | | | | 340/665 |
| 6,448,670 | B1 * | 9/2002 | Onodera | G05G 9/047 |
| | | | | 74/473.1 |
| 6,480,183 | B1 * | 11/2002 | Van Ruymbeke | G05G 9/047 |
| | | | | 324/660 |
| 6,624,807 | B2 * | 9/2003 | Bredow | G05G 9/047 |
| | | | | 345/161 |
| 6,737,632 | B2 * | 5/2004 | Robert | G06F 3/0317 |
| | | | | 250/221 |
| 7,341,521 | B1 * | 3/2008 | Patterson | A63F 13/218 |
| | | | | 434/45 |
| 7,469,614 | B2 * | 12/2008 | Wang | F16H 59/105 |
| | | | | 74/473.26 |
| 7,563,169 | B2 * | 7/2009 | Miyakawa | G05G 9/04 |
| | | | | 345/161 |
| 8,425,320 | B1 * | 4/2013 | McVicar | A63G 31/16 |
| | | | | 434/71 |
| 8,753,208 | B2 * | 6/2014 | Jaouen | A63F 13/285 |
| | | | | 463/36 |
| 9,671,012 | B2 * | 6/2017 | Kim | F16H 59/10 |
| D890,758 | S * | 7/2020 | Woo | D14/413 |
| 11,426,651 | B1 * | 8/2022 | Jensen | A63F 13/245 |
| 11,717,747 | B2 * | 8/2023 | Heusinkveld | G05G 5/05 |
| | | | | 463/37 |
| 12,298,800 | B2 * | 5/2025 | Yu | G06F 3/0338 |
| 2001/0042418 | A1 * | 11/2001 | Junge | F16H 59/0204 |
| | | | | 74/473.18 |
| 2003/0034442 | A1 * | 2/2003 | Robert | G06F 3/0317 |
| | | | | 250/221 |
| 2004/0130530 | A1 * | 7/2004 | Gustafsson | G05G 5/28 |
| | | | | 345/161 |
| 2005/0054443 | A1 * | 3/2005 | Miyakawa | G05G 9/04 |
| | | | | 463/36 |
| 2006/0283279 | A1 * | 12/2006 | Levin | F16H 61/24 |
| | | | | 74/471 XY |
| 2007/0082735 | A1 * | 4/2007 | Bell | A63F 13/24 |
| | | | | 463/38 |
| 2011/0300942 | A1 * | 12/2011 | Jaouen | A63F 13/285 |
| | | | | 463/38 |
| 2017/0139437 | A1 * | 5/2017 | Miyachi | G05G 25/04 |
| 2023/0211231 | A1 * | 7/2023 | Heusinkveld | G05G 5/05 |
| | | | | 463/37 |
| 2023/0398441 | A1 * | 12/2023 | Heusinkveld | A63F 13/98 |
| 2025/0135331 | A1 * | 5/2025 | Maher | A63F 13/245 |

* cited by examiner

SEQUENTIAL SHIFTER

BACKGROUND OF THE INVENTION

Computer games and simulators utilize various input devices to control one or more functions of a playable character and/or vehicle. These input devices may be designed to mimic real-life versions of particular devices. For example, users may utilize input devices that have form factors and functionality that mimic real-life steering wheels, shift mechanisms, brake input levers, and the like when playing driving games and using simulators. Some users may want as realistic experience possible when experiencing such games or simulators, which may require the user to accumulate a large number of input devices. This may be particularly true for enthusiasts of different types of driving/racing games and simulators, where different types of input devices may be used depending on the type of vehicle being simulated. For example, some vehicles may have standard H-shift mechanisms, while others may utilize sequential shift mechanisms. Similarly, some types of driving may rely heavily on handbrakes, while others may rely predominantly on pedal braking. Improvements are desired to help reduce the number of different input devices needed to properly simulate such experiences and to simplify manufacturing of such devices.

BRIEF SUMMARY OF THE INVENTION

Some embodiments of the present technology may encompass dual-function input devices for a computing device. The input devices may include a housing. The input devices may include an actuator disposed within the housing. The actuator may be pivotable relative to the housing in a first direction and a second direction. The actuator may include a first connector and a second connector. The input devices may include an input lever that is coupleable with the actuator via one of the first connector and the second connector. The actuator may be configurable between a first mode by coupling the input lever with the first connector and a second mode by coupling the input lever with the second connector. In the first mode the input lever and the actuator may be pivotable in the first direction by a first distance. In the second mode the input lever and the actuator may be pivotable in the first direction by a second distance that is greater than the first distance.

In some embodiments, the actuator may be configurable between the first mode and the second mode without use of tools. In the first mode, the input lever and the actuator may be pivotable in the second direction. In the first mode, the actuator may be biased to return to a neutral position when no external forces are applied to the input lever in the first direction or the second direction. In the second mode, the actuator may be biased toward the second direction by a spring. A spring force of the spring may be variable such that the spring force increases as a displacement of the actuator in the first direction increases. In the first mode the actuator may operate as a sequential shifter and in the second mode the actuator operates as a handbrake. The input devices may include a detent mechanism that is engaged when the actuator is in the first mode and that is disengaged when the actuator is in the second mode.

Some embodiments of the present technology may encompass dual-function input devices for a computing device that may include a housing. The input devices may include an actuator disposed within the housing. The actuator may be pivotable relative to the housing in a first direction and a second direction, the actuator comprising a first threaded receptacle and a second threaded receptacle. The input devices may include an input lever that is coupleable with the actuator via one of the first threaded receptacle and the second threaded receptacle. The actuator may be configurable between a first mode by engaging the input lever with the first threaded receptacle and a second mode by engaging the input lever with the second threaded receptacle. In the first mode the input lever and the actuator may be pivotable in the first direction by a first distance. In the second mode the input lever and the actuator may be pivotable in the first direction by a second distance that is greater than the first distance.

In some embodiments, the input devices may include a detent mechanism that is engaged when the actuator is in the first mode. The detent mechanism may include a spring-loaded ball. The detent mechanism may include a detent block that defines a recess that is engageable with the spring-loaded ball. The detent block may be translatable relative to the housing such that insertion of the input lever into the first threaded receptacle forces the recess into engagement with the spring-loaded ball. The input devices may include at least one spring that biases the actuator to return to a neutral position when no external forces are applied to the input lever in the first direction or the second direction when in the first mode. The at least one spring may include a first spring and a second spring. A spring force of the first spring and a spring force of the second spring may be substantially equal. The input devices may include an additional spring that biases the actuator toward the second direction when in the second mode.

Some embodiments of the present technology may encompass dual-function input devices for a computing device that may include a housing. A top surface of the housing may define a slot. The input devices may include an actuator disposed within the housing. The actuator may be pivotable relative to the housing in a first direction and a second direction. The actuator may include a first threaded receptacle and a second threaded receptacle. The input devices may include an input lever that is coupleable with the actuator via one of the first threaded receptacle and the second threaded receptacle. The first threaded receptacle and the second threaded receptacle may be aligned along a length of the slot. The actuator may be configurable between a first mode by engaging the input lever with the first threaded receptacle and a second mode by engaging the input lever with the second threaded receptacle. In the first mode the input lever and the actuator may be pivotable in the first direction by a first distance. In the second mode the input lever and the actuator may be pivotable in the first direction by a second distance that is greater than the first distance. When the input lever is engaged with the first threaded receptacle or the second threaded receptacle, a portion of the input lever may extend through the slot.

In some embodiments, in the first mode a maximum displacement of the actuator in each the first direction and the second direction may be substantially equal. In the second mode, the actuator may be biased toward the second direction by a spring. A magnitude of a spring force of the spring may be adjustable. The input devices may include a knob coupled with the housing. Rotation of the knob may cause a corresponding adjustment to the magnitude of the spring force. In the first mode a maximum displacement of the actuator in each the first direction and the second direction may be between 5 and 20 degrees. In the second mode a maximum displacement of the actuator in the first direction may be between 10 and 30 degrees.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to input devices for computer devices that are operable to simulate the function and/or general form factor of multiple devices. For example, such dual-function input devices may be designed to be physically reconfigured between two or more modes that each simulate the function of a different real-world control device. As just one example, the input devices may be configured between a sequential shift mechanism mode and a handbrake mode, although numerous other possibilities exist. In some embodiments, the dual-function input devices may be designed such that configuring the dual-function input device between various modes may be performed without the use of any tools, such as screwdrivers and/or wrenches. For example, threaded connectors may be utilized that enable the dual-function input devices to switch between various modes of operation simply by rotating an input lever or other component to loosen and remove the input lever from one location and inserting the input lever at a different location and rotating the input lever to tighten the input lever at the different location.

By enabling a single input device to simulate the functionality of multiple real-world control devices, embodiments may help reduce the number of input devices a user must purchase, set up, and/or store to simulate the various control devices associated with a given vehicle. Additionally, such designs may simplify the design and manufacture of the input devices. While discussed primarily in terms of a dual-function input device that may be useable to simulate the functions of a sequential shift mechanism and a handbrake in automobile driving/racing games and/or simulators, it will be appreciated that the number and/or type of functional modes may be tailored to meet the needs of a particular application.

Figure 1A:
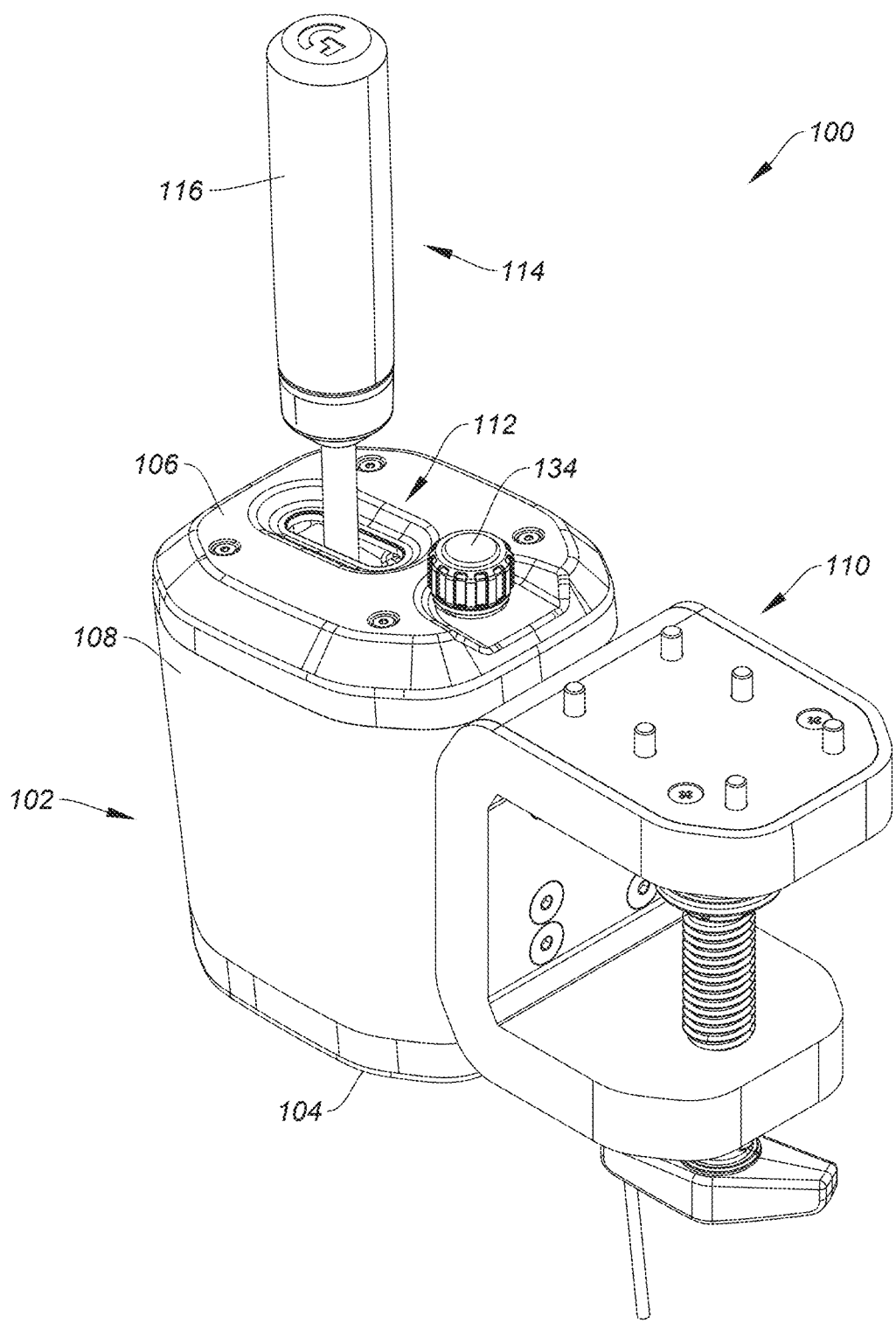
FIG. 1A illustrates an isometric view of a dual-function input device according to embodiments of the present invention.

Turning now to FIGS. 1A-1H, an embodiment of a dual-function input device 100 is illustrated. Input device 100 may include a housing 102, which may have any shape. As illustrated in FIG. 1A, housing 102 may include a bottom surface 104, a top surface 106, and at least one lateral surface 108 that extends between and couples the bottom surface 104 and top surface 106. The housing 102 may be designed to sit atop a support surface, such as a desk or table. In some embodiments, the housing 102 may include and/or be coupled with one or more mounting mechanisms that enable the housing 102 to be fixed in place relative to a given structure. For example, the housing 102 may include a mounting bracket or other structure that may enable the housing 102 to be bolted, clamped, vacuum mounted, and/or otherwise secured to a support structure. As illustrated, housing 102 includes a bracket 110 that extends outward from the lateral surface 108. Bracket 110 is shown as being generally C-shaped, although other shapes are possible. Bracket 110 may include a threaded clamping member that extends through an upper or lower surface of the bracket 110 and, when tightened, enables the bracket 110 to be secured to a desk, table, or other support structure. While shown with the bracket 110 extending from the lateral surface 108, it will be appreciated that the bracket 110 and/or another mounting mechanism may be coupled with and/or extend from a different surface of the housing 102, such as bottom surface 104 and/or top surface 106.

Figure 1B:
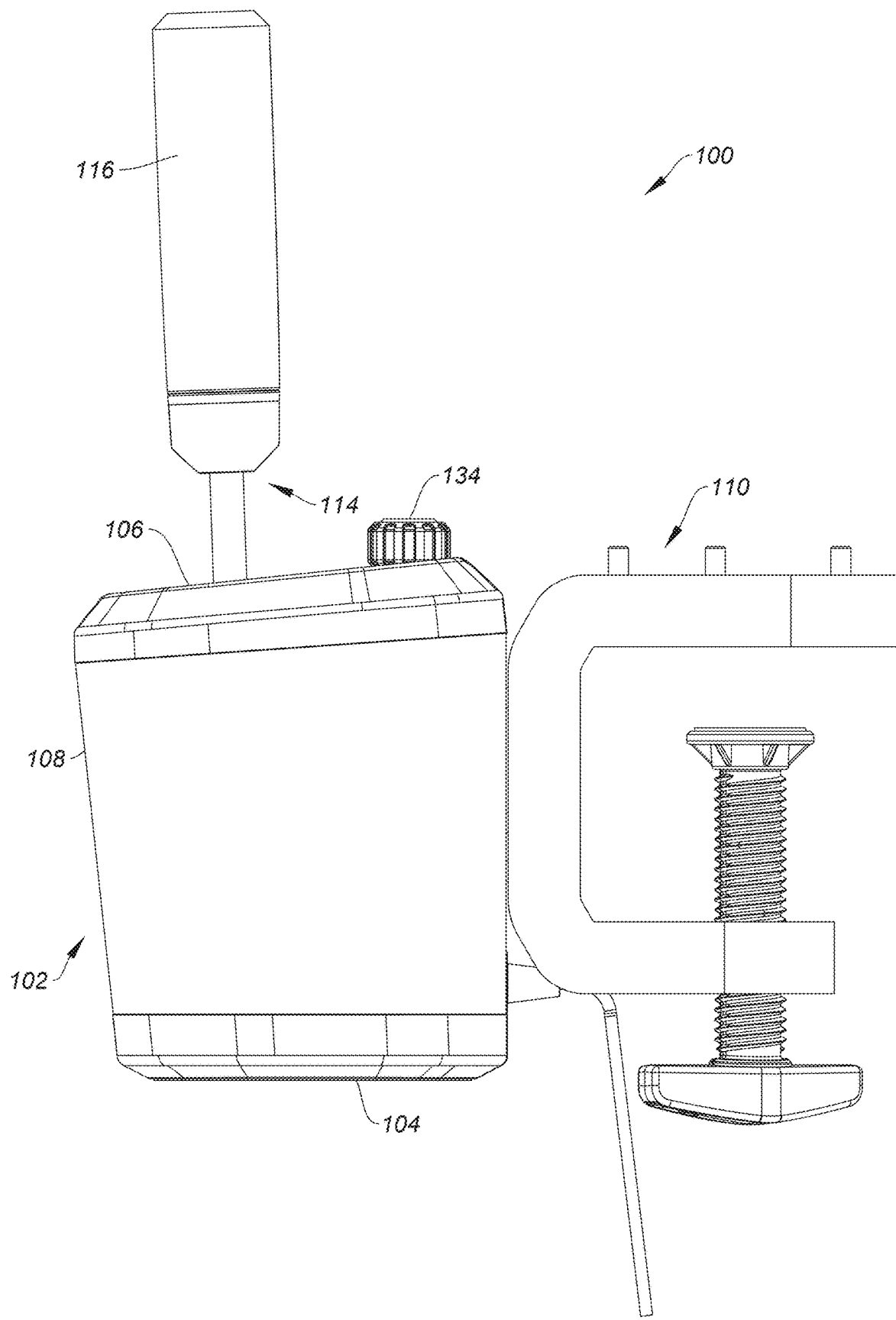
FIG. 1B illustrates a side elevation view of the dual-function input device of FIG. 1A.

Top surface 106 may define a slot 112, which may extend along all or a portion of a length of the top surface 106. Slot 112 may be generally linear, although non-linear slots may be utilized in some embodiments. Slot 112 may provide access for an input lever 114, such as an input lever and/or brake input lever, to be inserted into an interior of the housing 102 for coupling with an actuator 120 that is disposed within the housing 102, as shown in FIG. 1B. Slot 112 may be elongate, which may enable the input lever 114 to be moved along a track of motion, such as (but not limited to) in two opposite directions along a linear travel path.

Figure 1C:
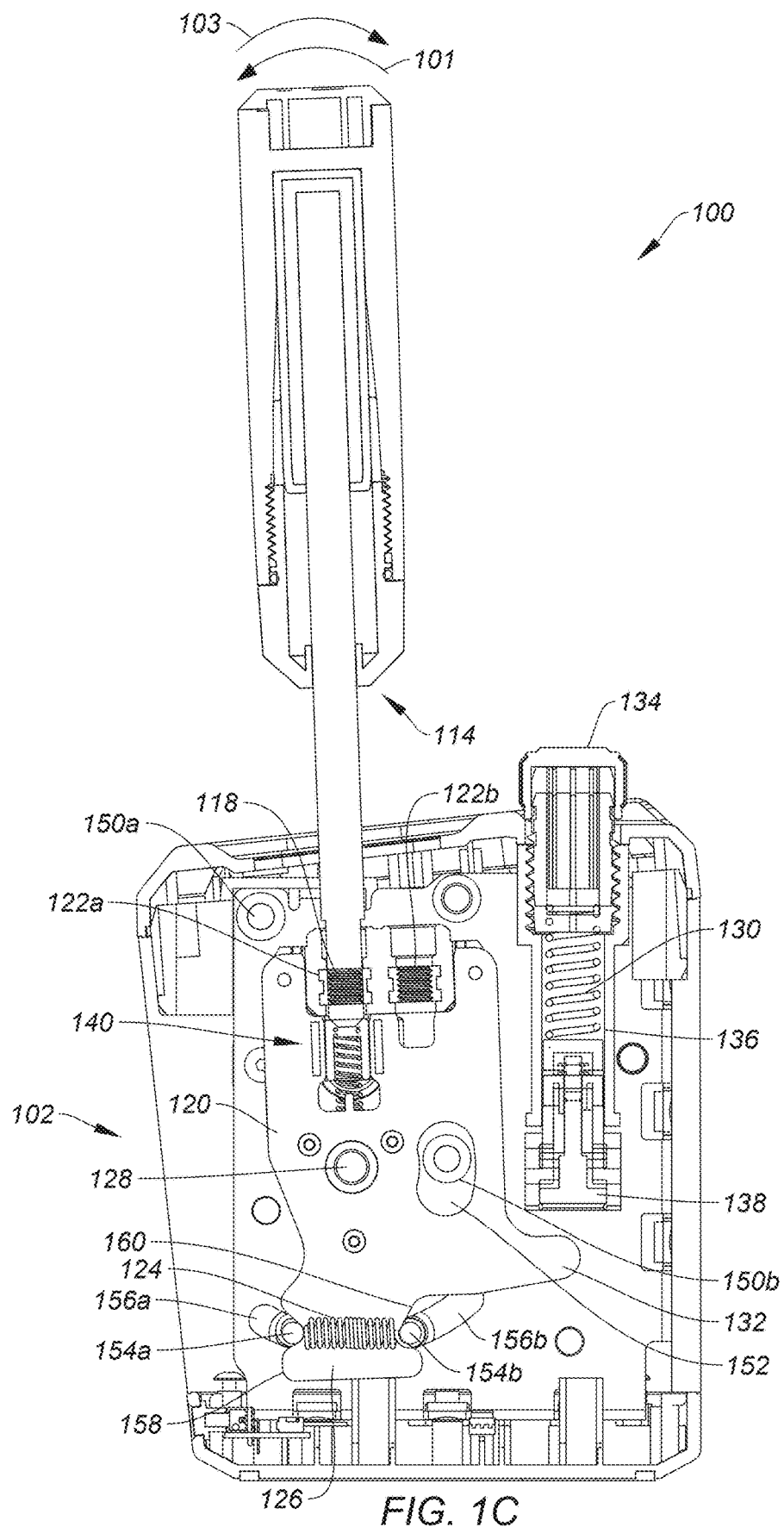
FIG. 1C illustrates a cross-sectional side elevation view of a lever of the dual-function input device of FIG. 1A in a neutral position in a first mode of operation.

Input lever 114 may be used to operate the actuator 120, as will be discussed in greater detail below. Input lever 114 may include a handle 116, which may be positioned at a first or top end of input lever 114. Handle 116 may have a greater diameter than the rest of input lever 114 and may provide a user a location to grasp and manipulate the input lever 114, and subsequently actuator 120. The lower or second end of input lever 114 may include one or more connectors 118 that enable the input lever 114 to be reversibly coupled with the actuator 120. The connector 118 may require a user to utilize one or more tools (such as screwdrivers, wrenches, etc.) to engage or disengage the input lever 114 from the actuator 120. In other embodiments, the connector 118 may be engaged and/or disengaged from the actuator 120 without the use of tools (e.g., using only a user's hands). For example, as illustrated in FIG. 1C, the connector 118 may be in a form of a threaded connector, such as a male threaded member. This may enable a user to engage or disengage the input lever 114 from the actuator 120 by rotating the input lever 114 about a longitudinal axis of the input lever 114 to engage and disengage the threads of the connector 118 from corresponding threads formed in the actuator 120. While primarily discussed with respect to a threaded connector 118, it will be appreciated that other connectors such as snaps, magnets, and/or other mechanical connectors may be utilized in various embodiments.

As noted above, all or a portion of actuator 120 may be disposed within housing 102. Actuator 120 may be pivotally mounted within housing 102 such that the actuator 120 is pivotable in at least two directions relative to the housing 102. For example, the actuator 120 may be pivotally coupled to the housing 102 about an axle 128 or other pivot point. The pivot point may be disposed near a center of the actuator 120 in some embodiments, although other locations are possible. The actuator 10 may be pivotable in a first direction 101 relative to a longitudinal axis of slot 112 and a second direction 103 that is opposite the first direction 101. Movement of the actuator 120 may be arc-shaped (such as following a circumferential arc of the axle 128) and constrained within a single plane in some embodiments, although other travel paths are possible in various embodiments.

The actuator 120 may include two or more connectors 122 that are used to secure the input lever 114. As illustrated, actuator 120 includes a first connector 122a and a second connector 122b. Connectors 122 may be spaced apart from one another along a length (e.g., direction aligned with the longitudinal axis of slot 112) and/or width (e.g., direction orthogonal to the longitudinal axis of slot 112) of the housing 102 and/or actuator 120. For example, as illustrated the first connector 122a and second connector 122b are aligned along the width of the actuator 120 and are spaced apart along the length of the actuator 120. Each connector 122 may be configured to engage with connector 118 of input lever 114 to enable the input lever 114 to be engaged and/or disengaged with the actuator 120. In the illustrated embodiment, the connectors 122 each include threaded connections, such as female threaded receptacles, that may receive corresponding threads of the male threaded connector 118 of the input lever 114. It will be appreciated that other arrangements are possible in some embodiments. For example, the connector 118 may be a female threaded receptacle while the connectors 122 may be male threaded members. In other embodiments non-threaded connectors (such as snaps, magnets, and/or other mechanical connections) may be utilized. In some embodiments, the connectors 122 may require the use of one or more tools to engage and/or disengage the input lever 114. Additionally, while shown with connector 122a and 122b having a same form, it will be appreciated that in other embodiments the connectors 122 may have different forms from one another. Connectors 122 may be at a same or different depth within the actuator 120. The axle 128 or other pivot point may be aligned with one of the connectors 122 in some embodiments, or may be offset from both connectors 122, such as by being disposed between the connectors 122. As illustrated, the axle 128 is aligned with a central axis of the first connector 122a and offset from the central axis of the second connector 122b.

The function of the actuator 120 and input device 100 may be switched between different modes of operation. In some embodiments, making the necessary mechanical changes to switch between modes may be performed merely by moving the input lever 114 from the first connector 122a to the second connector 122b, without the use of any tools or any other inputs by the user (although some embodiments may require a switch or other mechanism to change the processing/control mode within a control module of the input device 100). The engagement of the input lever 114 within a given connector 122 of the actuator 120 may automatically alter the operation of the input device 100, including adjusting the amount of travel in the first direction 101 and/or the second direction 103. For example, the actuator 120 may be configured to operate in a first mode by coupling the input lever 114 with the first connector 122a and in a second mode by coupling the input lever 114 with the second connector 122b (which may be performed without the use of any tools in some embodiments). In the first mode, the input lever 114 and/or the actuator 120 may be pivotable in the first direction 101 by a first distance (from a neutral position illustrated in FIG. 1C in which the actuator 120 and input lever 114 rest when no external forces are applied by a user). In the second mode the input lever 114 and/or the actuator 120 may be pivotable in the first direction 101 by a second distance (from the neutral position) that is greater than the first distance. In other words, the second mode may enable a greater range of travel in the first direction 101 than the first mode. The neutral position of the actuator 120 may be the same or different in each mode in various embodiments. In the first mode, the input lever 114 and/or the actuator 120 may also be displaceable in the second direction 103 (from the neutral position). The maximum displacement in the second direction 103 may be the same or different than the maximum displacement in the first direction 101 when in the first mode. In the second mode, the input lever 114 and/or the actuator 120 may or may not be displaceable in the second direction 103 (from the neutral position). For example, in some embodiments the actuator 120 may not move in the second direction 103 when in the second mode other than to return to the neutral position once moved in the first direction 101 and external forces on the input lever 114 have been removed.

While illustrated with the first mode and the second mode having neutral positions that are offset from one another along a length of housing 102, some embodiments may include neutral positions for the first and second mode that are the same and/or otherwise aligned along the length of housing 102. The maximum displacement of input lever 114 along the length of housing 102 and/or slot 112 may be the sum of the maximum displacement of the input lever 114 in the first direction and the maximum displacement of the input lever 114 in the second direction. For example, in some embodiments the maximum displacement may be the sum of the maximum displacement of the input lever 114 in the first direction when in the second mode and the maximum displacement of the input lever 114 in the second direction when in the first mode.

Figure 1D:
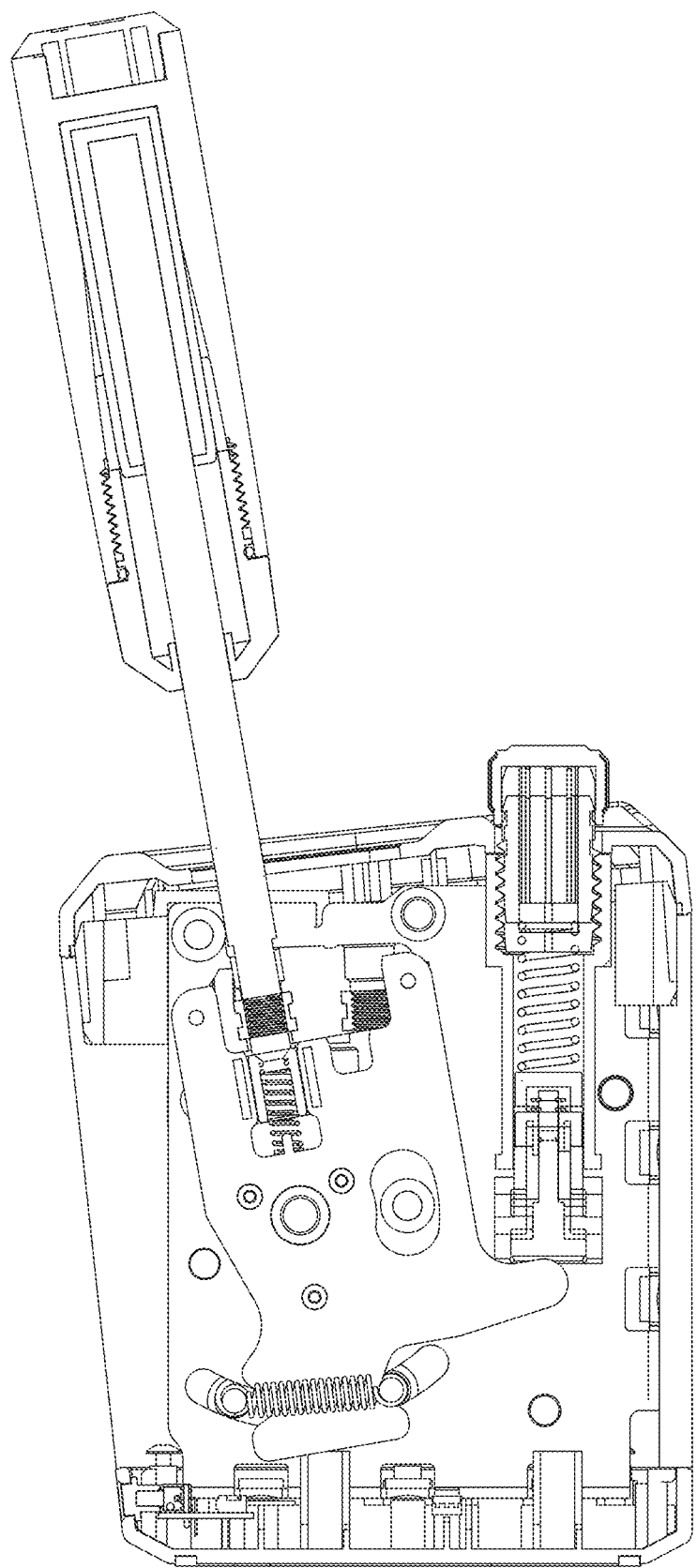
FIG. 1D illustrates a cross-sectional side elevation view of a lever of the dual-function input device of FIG. 1A moved in a first direction in the first mode of operation.
Figure 1E:
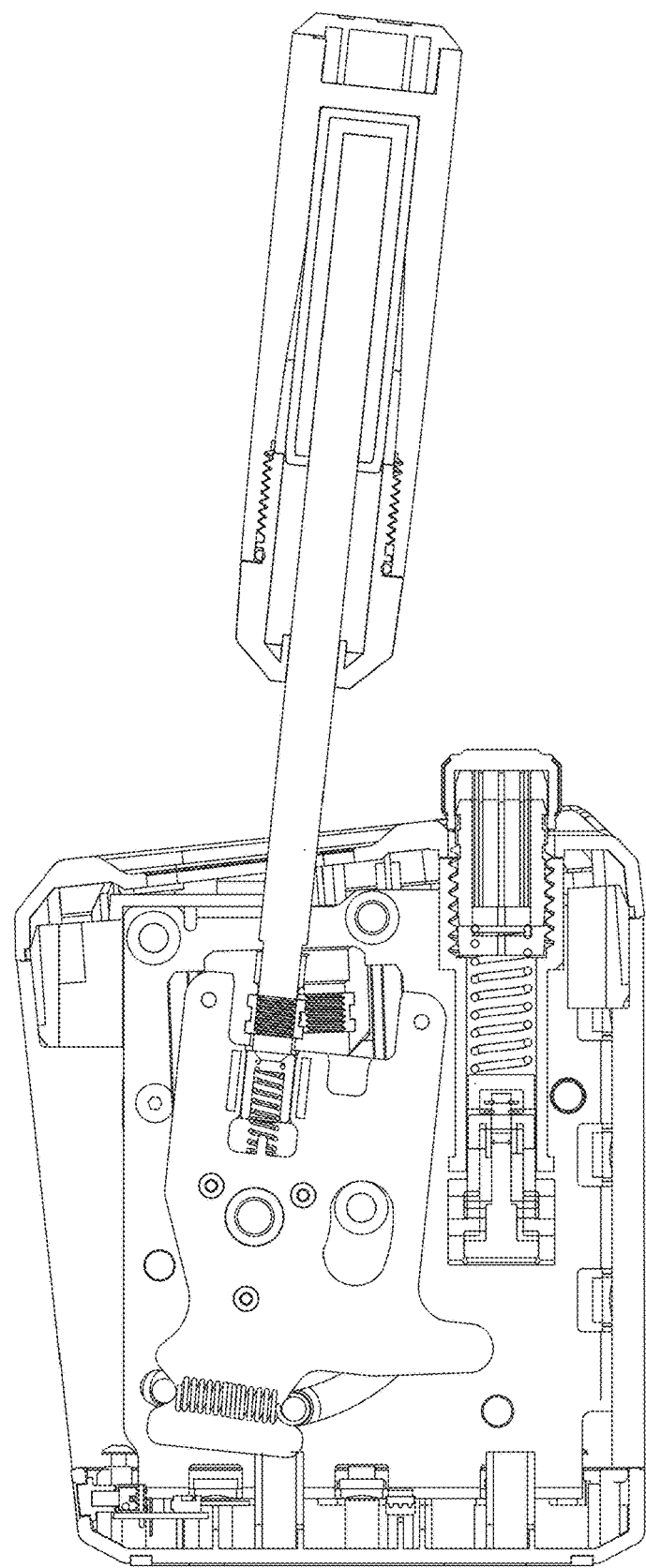
FIG. 1E illustrates a cross-sectional side elevation view of a lever of the dual-function input device of FIG. 1A moved in a second direction in the first mode of operation.

The actuator 120 may include and/or be coupled with a number of resilient members, such as springs, that may help provide resistance to movement of the input lever 114 and actuator 120, as well as which may return the input lever 114 and actuator 120 to the neutral position when no external forces are applied by a user. Each resilient member may provide a tension or compression force to the actuator 120 that helps return the actuator 120 to the neutral position. In the illustrated embodiment, a tension spring 124 is positioned alongside the actuator 120, extending from a front edge to a rear edge of the actuator 120. Each end of the spring 124 may be affixed to a pin 154 or other member that is slidably engaged with an arcuate slot 156 formed in the housing 102 and/or other structural member that is at a fixed location within the housing 102. As illustrated, each pin 154 is received in a separate slot 156. Each slot 156 is arcuate and extends about an arc that is coaxial with the axle 128 such that the pins 154 are able to slide along a length of the given slot 156 as the actuator 120 is pivoted about the axle 128. When the actuator 120 is in the neutral position, each pin 154 is positioned at an end of the respective slot 156 that is closest to the actuator 120. In the illustrated embodiment, a bottom end 126 of the actuator 120 includes two protrusions 158, with one protrusion 158 extending forward and one protrusion 158 extending rearward. A recess 160 is defined between each protrusion 158 and a main body of the actuator 120. Each pin 154 is seated within one of the recesses 160. When the actuator 120 is pivoted in the first direction 101, the rearward pin 154a remains in place, with the rearward pin 154a abutting a forward end of the slot 156a (e.g., end of the slot 156a closest to the actuator 120). The forward pin 154b slides within the respective slot 156b and stretches spring 124 to permit the actuator 120 to pivot in the first direction 101 within the housing 102 and away from rearward pin 154a as shown in FIG. 1D. When the user force is removed from the actuator 120, the spring 124 compresses and draws the forward pin 154b back to a position in which the forward pin 154b rests against a rearward end of the slot 156b (e.g., end of the slot 156b closest to the actuator 120), with the forward pin 154b pulling the actuator 120 back to the neutral position and proximate rearward pin 154a as shown in FIG. 1C. When the actuator 120 is pivoted in the second direction 103, the forward pin 154b remains in place, with the forward pin 154b abutting a rear end of the slot 156b (e.g., end of the slot 156b closest to the actuator 120). The rearward pin 154a slides within the respective slot 156 and stretches spring 124 to permit the actuator 120 to pivot in the second direction 103 within the housing 102 and move away from forward pin 154b as shown in FIG. 1E. When the user force is removed from the actuator 120, the spring 124 compresses and draws the rearward pin 154a back to a position in which the rearward pin 154a rests against a forward end of the slot 156 (e.g., end of the slot 156a closest to the actuator 120), with the rearward pin 154a pulling the actuator 120 back to the neutral position and proximate forward pin 154b. In some embodiments, the spring force of spring 124 may be selected to provide a given amount of resistance to movement of the actuator 120 in the first and second directions.

In some embodiments, the slots 156 for each pin 154 may be the same length. In other embodiments, the slots 156 may have different lengths. For example, the forward slot 156b may be longer than the rearward slot 156a, which may enable the forward slot 156b to accommodate a greater range of displacement in the first direction 101 when the input device 100 is operating in the second mode as will be discussed in greater detail below.

Figure 2:
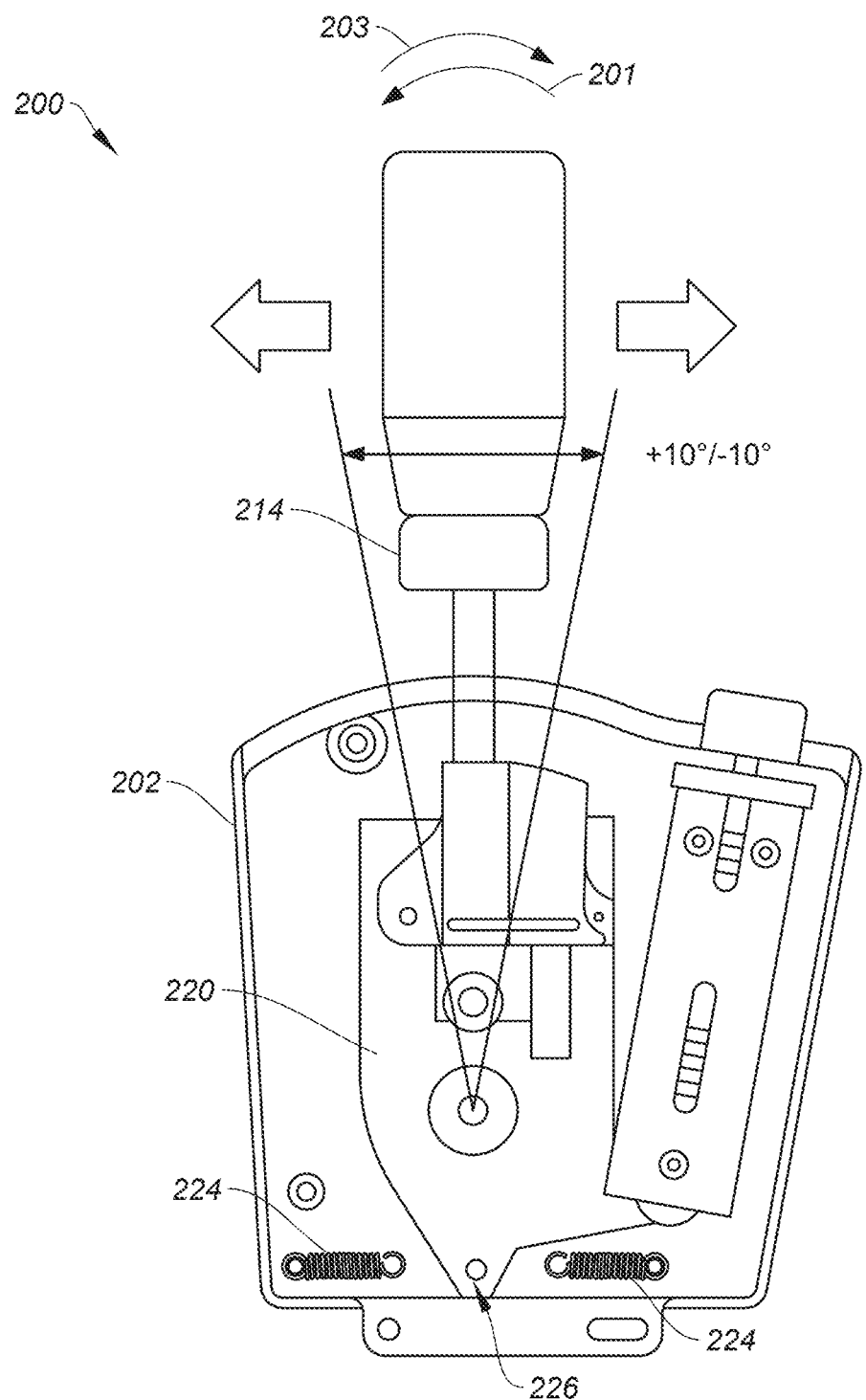
FIG. 2 illustrates a cross-sectional side elevation view of a dual-function input device according to embodiments of the present invention.

It will be appreciated that the spring arrangement described above is merely provided as one example, and that other configurations may be used to bias an actuator to return to the neutral position in various embodiments. For example, FIG. 2 illustrates an embodiment of an input device 200 with an alternative spring arrangement. Input device 200 may include any of the features described in relation to input device 100. As illustrated, two springs 224 or other resilient members may be coupled with opposing ends of an actuator 220. For example, one end of each spring 224 may be fixed to a housing 202, with an opposing end of each spring 224 being coupled to an opposite end of the actuator 220 (e.g., front end or rear end of the actuator 220). As illustrated, the springs 224 are coupled with a bottom portion 226 of the actuator 220, which may provide a location for coupling the free ends of the springs 224. The spring force of the springs 224 may be equal or otherwise selected to balance actuator 220 in a neutral position. Such a design ensures that an input lever 214 and the actuator 220 may return to the neutral position after external forces have been removed. For example, a user may utilize the input lever 214 to move the actuator 220 in a first direction 201 or a second direction 203, and when the user ceases the application of force to the input lever 214, the input lever 214 and actuator 220 will be returned to the neutral position by the force of springs 224. In some embodiments, the spring force of each spring 224 may be selected to provide a given amount of resistance to movement of the actuator 220 in the first and second directions.

Turning back to FIGS. 1A-1H, input device 100 may include an additional spring 130 or other resilient member that biases the actuator 120 toward the second direction 103 to provide resistance to movement of the actuator 120 in the first direction 101 in the second mode. For example, the spring 130 may be a tension spring that is positioned on a rear side of the actuator 120 and pulls the actuator 120 toward the second direction 103 or a compression spring that is positioned on a front side of the actuator 120 and pushes the actuator 120 toward the second direction 103, as illustrated in FIG. 1C. Spring 130 may be oriented vertically as shown here or may be oriented horizontally or at some other angle relative to the housing 102. In the illustrated embodiment, actuator 120 includes a protrusion 132 that extends from a forward edge of the actuator 120. The spring 130 may be coupled with and/or include an end plate or end cap 138 that may extend over an end of the spring 130 closest to the protrusion 132. As the actuator 120 moves in the first direction 101, the protrusion 132 may begin to contact the end cap 138 and force the end cap 138 to compress the spring 130, with the compressed spring 130 providing additional resistance to the movement of the actuator 120 in the first direction 101. In other embodiments, an end of spring 130 may be coupled with the protrusion 132 (such as by being inserted into an aperture formed in protrusion 132) to couple spring 130 with the actuator 120. It will be appreciated that other coupling arrangements are possible in various embodiments. In some embodiments, engagement of the protrusion 132 with the end cap 138 may occur only during the second mode of operation, while in other embodiments engagement of the protrusion 132 with the end cap 138 may occur in both the first and second modes. In embodiments in which the engagement of the protrusion 132 with the end cap 138 occurs only during the second mode of operation of the input device 100, the protrusion 132 and the end cap 138 may be spaced apart from one another by an angular displacement that is greater than or equal to a maximum displacement of the actuator 120 when in the first mode.

In some embodiments, a spring force of the spring 130 may be linear, while in other embodiments the spring force may be progressive such that the spring force increases as a displacement of the actuator 120 in the first direction 101 increases. Use of such progressive springs may better simulate the force curve of a handbrake, which gets progressively harder to pull as the displacement of the hand lever increases. Additionally, the use of a progressive spring may help smooth the transition between the force applied by spring(s) 124 and spring 130 when in the second mode, as will be discussed below. In some embodiments, the magnitude of the spring force of spring 130 may be adjustable. For example, input device 100 may include a knob 134 or other adjustment member that may enable a user to control the magnitude of the spring force. The user may rotate or otherwise interact with the knob 134, which may adjust an amount of compression or preload of the spring 130 when the actuator 120 is in the neutral position, thereby changing the magnitude of the spring force. In some embodiments, the spring 130 may be removable from the housing 102. For example, the spring 130 may be provided within a spring housing 136 that is insertable into housing 102, such as by sliding the spring housing 136 into and out of a slot or channel formed within housing 102. This may enable a user to replace the spring 130 (such as with a spring having a different spring force and/or force profile) and may provide the user with greater control over the overall spring force of the spring 130.

Figure 1F:
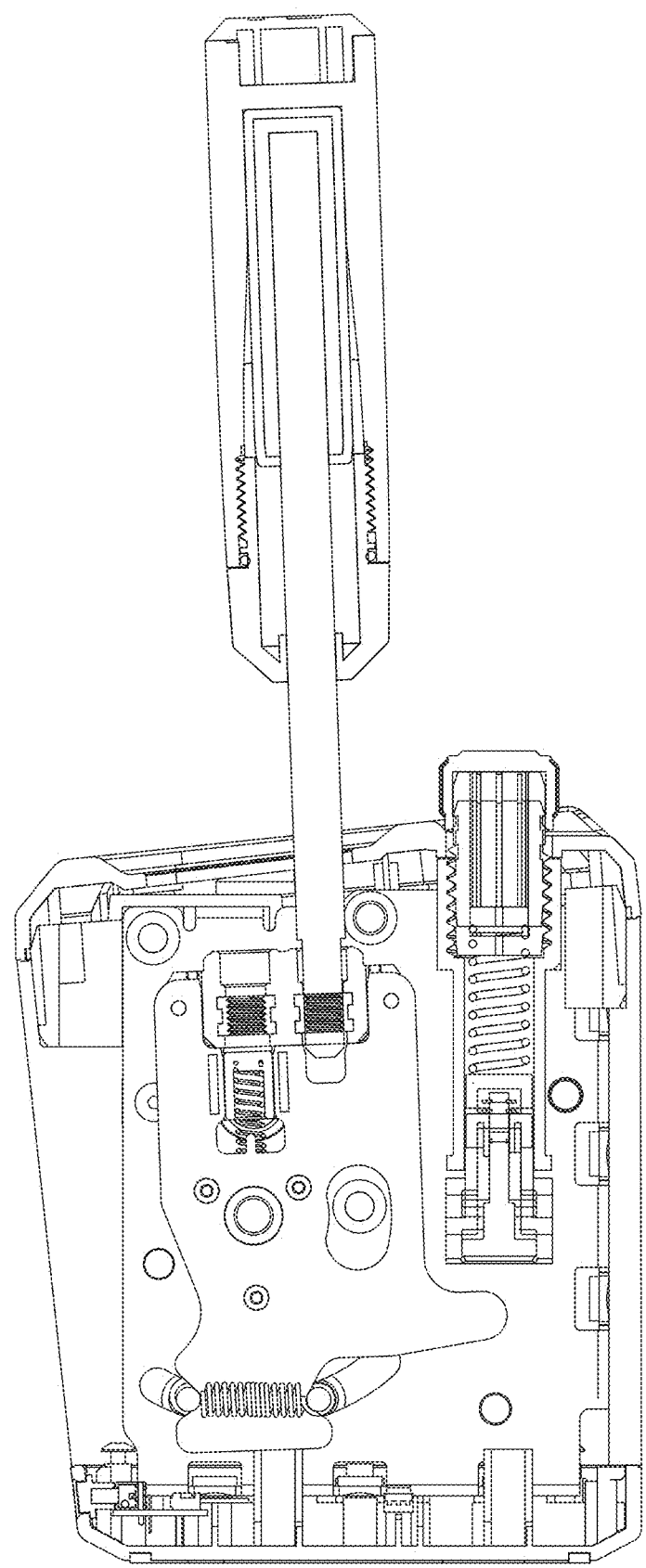
FIG. 1F illustrates a cross-sectional side elevation view of a lever of the dual-function input device of FIG. 1A in a neutral position in a second mode of operation.

Input device 100 may include a detent mechanism 140 that may provide tactile and/or audible feedback to a user when the actuator 120 has been moved a sufficient distance to trigger the desired function. At least a portion of the detent mechanism 140 may be coupled with the actuator 120 such that the detent mechanism 140 automatically provides the feedback based solely on the movement of the actuator 120 in one or more modes of operation of the actuator 120. As best illustrated in FIG. 1H, the detent mechanism 140 may include a detent block 142 that may be coupled with and/or formed as a portion of the actuator 120. For example, as illustrated the detent block 142 is disposed on a lateral surface of actuator 120. The detent block 142 may define a recess 144, such as an arcuate recess, which may face outward from the actuator 120. In some embodiments, the recess 144 may be elongate and may be aligned with one of the connectors 122. For example, as illustrated, a longitudinal axis of the recess 144 is parallel to a central axis of the first connector 122a and is aligned or substantially aligned with the central axis of the first connector 122a along a length of the actuator 120.

The detent block 142 may be movably coupled with the actuator 120 in some embodiments. For example, the detent block 142 may be coupled with the actuator 120 along a guide or track that enables the detent block 140 to slide or otherwise translate relative to the actuator 120 and housing 102. In some embodiments, a resilient member, such as a spring, may be used to bias the detent block 142 in one direction. For example, in the illustrated embodiment the detent block 142 is spring-biased in an upward direction toward first connector 122a. In embodiments in which the detent block 140 and recess 144 are axially aligned with one of the connectors 122 (e.g., first connector 122a), the detent block 142 may be positioned such that as the input lever 114 is inserted within the connector 122, the bottom end of the input lever 114 contacts a top edge of the detent block 142 and pushes the detent block 142 downward. The spring force may return the detent block 142 to a higher position when the input lever 114 is removed from the relevant connector 122. This enables the detent mechanism 140 to be automatically engaged in one mode of operation and automatically disengaged in another mode of operation as will be discussed in greater detail below.

The detent mechanism 140 may include a biased member 146, such as a spring-loaded ball, that may be engaged within the recess 144. For example, the recess 144 may be oriented vertically with the arcuate shape extending from a front of the detent block 142 to a rear of the detent block 142. The biased member 146 may extend laterally toward the detent block 142. For example, a spring may bias a ball or other member toward a lateral side 148 of the actuator 120 and toward a base of the arc of recess 144. The biased member 146 may always be aligned with and engaged with recess 144, or the biased member 146 may only be aligned and engaged with recess 144 during a specific mode of operation of the input device 100. For example, the biased member 146 may be positioned at a fixed location within the housing 102 below the first connector 122a. In the first mode of operation, when the detent block 142 is in an engaged position (e.g., a lowered position when the input lever 114 is inserted within the first connector 122a), the detent block 142 may be pushed downward into alignment with the biased member 146. The alignment of the biased member 146 and the recess 144 may cause the ball (or other engagement mechanism) of the biased member 146 to be inserted within the recess 144 to activate the detent mechanism 140 during operation in the first mode. When the input lever 114 is removed from the first connector 122a (such as when the input lever 114 is engaged with second connector 122b) spring force may return the detent block 142 to a raised position in which the biased member 146 is pulled out of engagement with the recess 144 to disengage the detent mechanism 140. In this manner, the detent mechanism 140 may be automatically engaged when the input device 100 is operating in the first mode and disengaged when the input device 100 is operating in the second mode. While described with the detent block 142 as being moveable within the housing 102 and the biased member 146 being fixed within the housing 102, it will be appreciated that other designs are possible. For example, the biased member 146 may be movable and the detent block 142 may be fixed, both components may be movable, or both components may be fixed.

The detent block 142 and/or the biased member 146 may be formed from a hard, wear-resistant material in some embodiments. For example, one or both components may be formed from steel or another alloy. The alloy may be treated, such as heat treated, to provide greater wear-resistance and overall durability. In some embodiments, the detent block 142 and biased member 146 may be formed from the same material and/or from materials have the same or substantially the same (e.g., within 10%, within 5%, within 3%, within 1%, or less) hardness, which may further prevent wear between the components.

As noted above, the detent mechanism 140 may be used to provide tactile feedback to the user when the user has moved the input lever 114 and actuator 120 a sufficient distance to perform a desired function. For example, in the first mode of operation, the input device 100 may operate as a sequential shifter for a vehicle in which movements of the input lever 114 and actuator 120 in the first direction 101 (beyond the neutral position) are used to downshift to a lower gear while movements of the input lever 114 and actuator 120 in the second direction 103 (beyond the neutral position) are used to upshift to a higher gear. The interaction between the biased member 146 and the recess 144 may produce a tactile response. For example, when the actuator 120 is in the neutral position in the first mode, the biased member 146 may be disposed within a center or apex of the recess 144 as shown in FIG. 1C. As the actuator 120 is moved in the first direction 101 and the second direction 103, the biased member 146 is moved along the arc of the recess 144 until the biased member 146 reaches the edge of the recess 144. The edge of the recess 144 may have an abrupt profile change (such as a noticeable ridge) such that as the biased member 146 reaches the edge of the recess 144 there is a snap or other abrupt change that causes a tactile and/or audible response, such as a clicking or snapping feel to the user. The recess 144 may be sized and shaped such that this feedback occurs when the user has moved the actuator 120 a sufficient distance for sensors of the input device 100 to register an input (such as an upward or downward gear shift).

The geometry and placement of the detent mechanism 140 may be selected to provide a desired level of tactile feedback. For example, the detent mechanism 140 may be designed to provide between 1 kg and 5 kg of force, between 1.5 kg and 4.5 kg of force, between 2 kg and 4 kg of force or between 2.5 kg and 3.5 kg of force. In some embodiments, the detent mechanism 140 may be positioned proximate the axle 128, which may make the force easier to feel for the user. In particular, the detent mechanism 140 may be positioned slightly above the axle 128. Such positioning may help prevent the forces of the detent mechanism from being overpowered by the moment created during movement of the input lever 114 and actuator 120 about axle 128. More specifically, by positioning the detent mechanism 140 closer to the handle 116 of the input lever 114, the moment arm is reduced which enables the feedback effect of the detent mechanism 140 to be more discernable to a user, while preventing the detent force from overpowering the force of the spring 124 that returns the actuator 120 to the neutral position.

As noted above, the input device 100 and actuator 120 may operate in multiple modes. In the illustrated embodiment, the input device 100 and actuator 120 may operate in two modes, with each mode providing different movement ranges and providing a different resistance force profile. In the first mode, the actuator 120 may be configured to be movable in both the first direction 101 and the second direction 103 by a fixed distance, which may enable the input device 100 to operate as a sequential shifter for a vehicle or to perform some other function. To engage the first mode, the user may insert the input lever 114 into the first connector 122a. Insertion of the input lever 114 into the first connector 122a may automatically cause the input device 100 and actuator 120 to operate in the first mode by securing the input lever 114 in a position to limit movement of the actuator 120 in the first direction 101. For example, a number of stops or other distance limiters 150 may be provided within the housing 102. In the illustrated embodiment, a first stop 150a may be in the form of a pin or other member that is positioned on the first direction 101 side of the first connector 122a and that prevents the input lever 114 from being pulled in the first direction 101 beyond a certain distance. For example, when the input lever 114 is pulled in the first direction 101 to a maximum distance (which may be equal to or exceed a distance needed to generate feedback from the detent assembly 140), the input lever 114 may contact the first stop 150a and be prevented from moving further in the first direction 101 to limit the throw distance of the input lever 114 in the first direction 101 relative to the neutral position. It will be appreciated that the position and form of the first stop 150a may be altered in different embodiments and the location and form illustrated here is merely provided as one example.

A second stop 150b may be provided to limit the throw distance of the input lever 114 in the second direction 103 relative to the neutral position. For example, as illustrated the actuator 120 defines a slot 152 that is aligned along an arc that is coaxial with axle 128. The slot 152 may be linear and/or curved in various embodiments. The second stop 150b may be a pin or other member that sits within the slot 152 and that contacts the actuator 120 to prevent the input lever 114 from being pulled in the second direction 103 beyond a certain distance. For example, when the input lever 114 is pulled in the second direction 103 to a maximum distance (which may be equal to or exceed a distance needed to generate feedback from the detent assembly 140), the actuator 120 may contact the second stop 150b and be stopped to limit the throw distance of the input lever 114 and actuator 120 in the second direction 103 relative to the neutral position. In some embodiments, the second stop 150b may be positioned closer to one end of the slot 152 than the other end of the slot 152. For example, in the illustrated embodiment, the slot 152 is disposed on a forward side of the axle 128 and the second top 150b is positioned closer to the top end of the slot 152 than the bottom end of the slot 152 (although the slot 152 and second stop 150b may be positioned at any location relative to actuator as long as the slot 152 is on a circumferential arc of the axle 128). Such a design may enable the second stop 150b to limit the throw distance of the actuator 120 in the second direction 103 to one distance, while limiting the throw distance of the actuator 120 in the first direction 101 to a different, longer distance, which may be used in the second mode as described below. It will be appreciated that the position and form of the second stop 150b may be altered in different embodiments and the location and form illustrated here is merely provided as one example.

In some embodiments, when in the first mode the maximum displacement and/or the distance needed to generate feedback from the detent assembly 140 may be equal or substantially equal (e.g., within 10%, within 5%, within 3%, within 1%, or less) in both the first direction 101 and the second direction 103. For example, the maximum displacement may be between 5 degrees and 20 degrees, between 8 degrees and 17 degrees, or between 10 degrees and 15 degrees. When the first mode enables the input device 100 to operate as a sequential shifter, the maximum displacement in both directions may be substantially equal to make the downshift and upshift movements similar to one another. As noted above, when no external force is applied to the input lever 114 or actuator 120 by a user, the force of spring 124 may bias the actuator 120 and input lever 114 to return to the neutral position shown in FIG. 1C.

As noted above, the insertion of the input lever 114 into the first connector 122a may also engage the detent mechanism 140. For example, the detent block 142 may be translatable relative to the actuator 120. In some embodiments, the detent block 142 may be slidable along a track or path that is coaxial and/or parallel to the first connector 122a, with a portion of the detent block 142 being disposed within the first connector 122a when the input lever 114 is removed. When the input lever 114 is inserted within the first connector 122a, the bottom end of the input lever 114 may push the detent block 142 downward into alignment and engagement with the biased member 146 to automatically engage the detent mechanism 140 when the input device 100 and actuator 120 are in the first mode.

In the second mode, the actuator 120 may be configured to be movable in the first direction 101 a fixed distance, which may enable the input device 100 to operate as a handbrake for a vehicle or to perform some other function. The actuator 120 may or may not be moveable in the second direction 103 (beyond the neutral position shown in FIG. 1F) when in the second mode. To engage the second mode, the user may insert the input lever 114 into the second connector 122b. Insertion of the input lever 114 into the second connector 122b may automatically cause the input device 100 and actuator 120 to operate in the second mode by securing the input lever 114 in a position that enables a greater displacement of the actuator 120 in the first direction 101 relative to the first mode. For example, the input lever 114 may be positioned a greater distance from the first stop 150b when in the second mode, which may enable the input lever 114 and actuator 120 to move a greater distance in the second direction 103. In some embodiments, the first stop 150a may limit the displacement in the first direction 101 when in the second mode, such as by the input lever 114 contacting the first stop 150a and being stopped to limit the throw distance of the input lever 114 in the first direction 101 relative to the neutral position. However, in other embodiments, a different stop, such as (but not limited to) second stop 150b may be used to limit the throw distance of the input lever 114 and actuator 120 in the first direction 101. For example, the slot 152 may move about second stop 150b as the actuator 120 is moved in the second direction 103 until the actuator 120 contacts the second stop 150b (such as the portion of actuator 120 defining a lower end of the slot 152 in the illustrated embodiment) to limit the movement of the input lever 114 and actuator 120 in the first direction 101 as shown in FIG. 1G.

In some embodiments, when in the second mode the maximum displacement may be between 10 degrees and 30 degrees, between 12 degrees and 28 degrees, between 15 degrees and 25 degrees, or about 20 degrees, although other values are possible. When the second mode enables the input device 100 to operate as a handbrake, the maximum displacement of the input lever 114 and actuator 120 may be greater than when in the first mode, and the input lever 114 and actuator 120 may or may not be displaceable in the second direction 103 beyond the neutral position. As noted above, when no external force is applied to the input lever 114 or actuator 120 by a user, the force of springs 124 may bias the actuator 120 and input lever 114 to return to the neutral position.

Figure 1G:
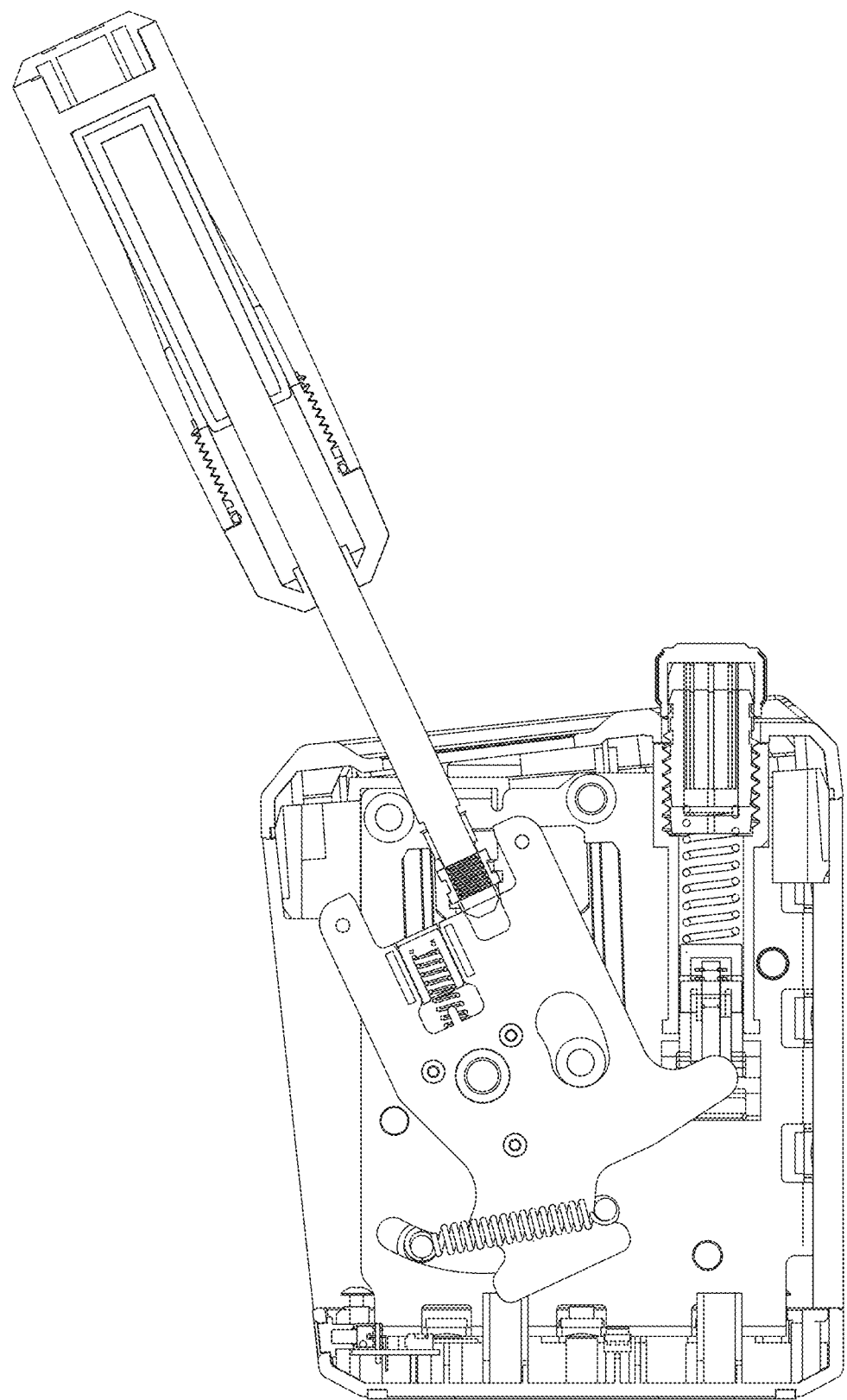
FIG. 1G illustrates a cross-sectional side elevation view of a lever of the dual-function input device of FIG. 1A moved in a first direction in the second mode of operation.
Figure 1H:
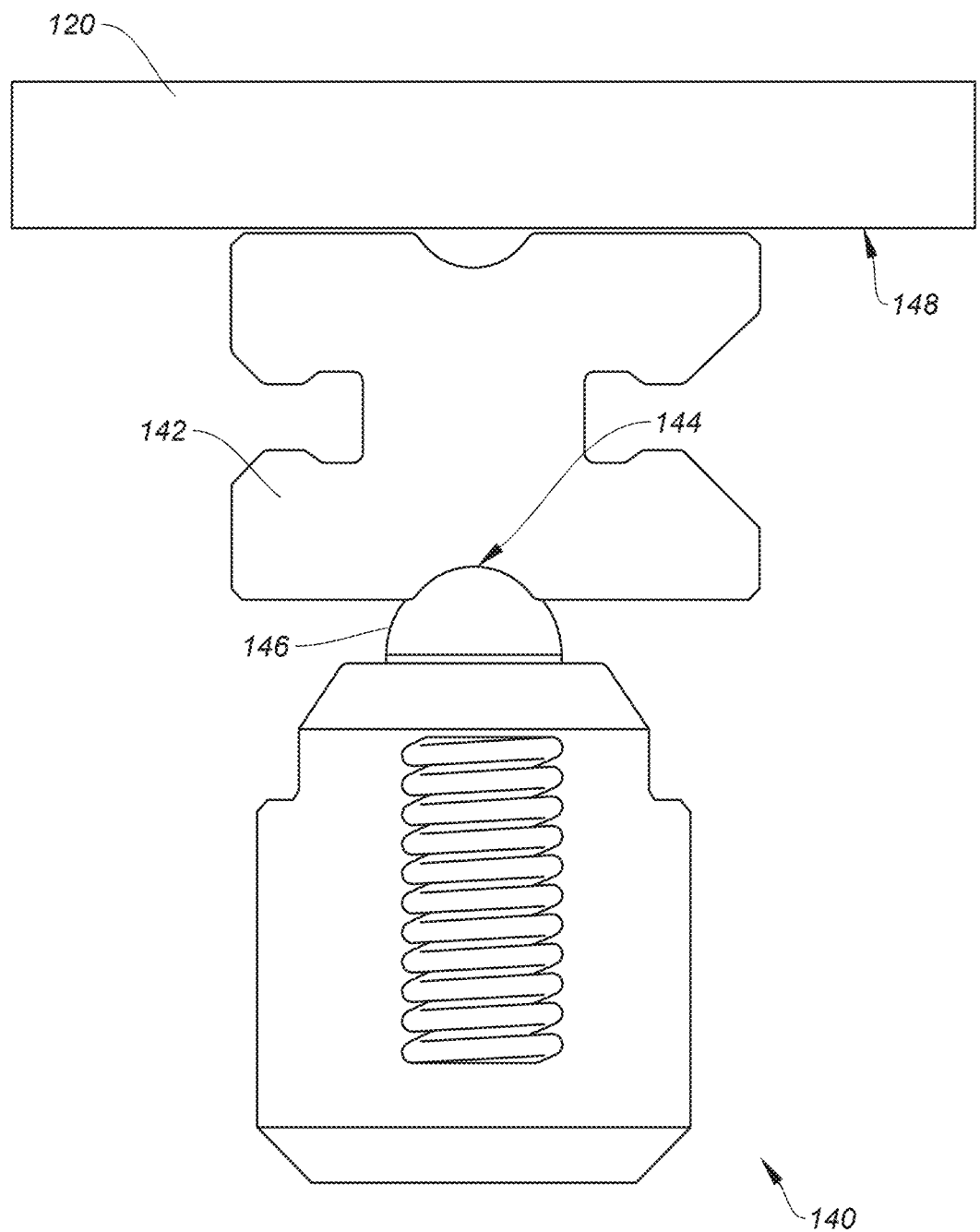
FIG. 1H illustrates a top view of a detent mechanism of the dual-function input device of FIG. 1A.

As shown in FIG. 1G, the greater displacement of the actuator 120 in the first direction 101 may engage the spring 130, which may provide additional resistance to movement of the input lever 114 and actuator 120 in the first direction 101, which may better simulate the operation of a handbrake. For example, the protrusion 132 may be spaced apart from the end cap 138 by a distance that prevents or limits contact between the protrusion 132 and the end cap 138 within the displacement range of the first mode, but that ensures that the protrusion 132 contacts and presses against the end cap 138 when greater displacement occurs within the second mode. The displacement beyond the limits of the first mode may cause the protrusion 132 to press against the end cap 138 and compress spring 130, which enables the force of spring 130 (which may be linear or progressive) to provide resistance to the movement of the input lever 114 and actuator 120 in the second mode. The use of a progressive force spring 130 may provide a more realistic force profile to better simulate the feel of a vehicle handbrake. For example, the greater displacement of the input lever 114 and actuator 120 in the first direction 101 the greater the resistance to further displacement. The resistance of the input lever 114 and actuator 120 in the second mode may operate in two phases. For example, the first phase may occur while the spring 124 is resisting movement of the input lever 114 and actuator 120 and the spring 130 is not compressed. In the second phase, both spring 124 and spring 130 may be resisting movement of the input lever 114 and actuator 120. The spring force of spring 124 and/or spring 130 may be selected to provide a relatively smooth transition between the first phase and the second phase. For example, a change of force during the transition from the first phase to the second phase may be completely smooth or may include a step or other shift in resistance of less than 20%, less than 10%, less than 5%, less than 1% or less relative to the end force of the first phase. In some embodiments, the force of the spring 130 may be adjusted via the knob 134, which may enable a user to customize the magnitude of the resistance force in the second mode. As illustrated in FIGS. 1F and 1G, in the second mode, the detent mechanism 140 may be disengaged, which may prevent the clicking or other feedback that is provided in the first mode of operation.

In some embodiments, rather than having a two phase (or other multi-phase) force profile for the second mode of operation, the second mode may utilize a completely different set of springs or other resilient members and may have one or more force phases. For example, rather than the first mode and the first phase of the second mode both utilizing spring 124, the first mode and the second mode may each use a dedicated set of resilient members to provide resistance to movement of the actuator 120. In such embodiments, a more complex arrangement may be utilized that enables the various resilient members to be engaged/disengaged for the relevant mode of operation of the input device 100.

In some embodiments, one or more sensors may be used to measure the displacement of the actuator 120 to determine when to send an input to a connected computing device. For example, when in the first mode, the sensors may determine when the actuator 120 has been moved in the first direction 101 and/or second direction 103 with a large enough displacement to trigger an input (e.g., far enough to elicit tactile feedback from the detent mechanism 140) and may deliver an input associated with a given direction of the displacement. For example, when the first mode is used to simulate a sequential shifter, a displacement in the first direction 101 may trigger a downshift input, while a displacement in the second direction 103 may trigger an upshift input. When in the second mode, the sensors may determine a degree of displacement of the actuator 120 in the first direction 101. For example, when the second mode is used to simulate a handbrake, a magnitude of the displacement in the first direction 101 may be mapped to correspond to a specific amount of braking pressure (e.g., 5%, 10%, 20%, 30%, 40%, 50%, etc.) over the possible range of displacement, with a corresponding braking pressure/force input being communicated to the computing device. In some embodiments, the sensors may include Hall effect sensors and/or Varistor sensors, although other types of sensors may be used in various embodiments. The sensors used in the first mode and the second mode may be the same set of sensors or different sensors. In some embodiments, additional sensors may be provided that automatically detect the current mode of the input device 100. For example, the input device 100 may include pressure sensors, proximity sensors, and/or other sensors that may detect whether the input lever 114 is inserted within the first connector 122a or the second connector 122b to determine the current operating mode. In other embodiments, the input device 100 may include a switch that enables the user to select the mode of operation. Based on the detected and/or selected mode, a printed circuit board, processing unit, or other circuitry of the input device 100 may activate a certain subset of sensors and/or change resulting input associated with a given sensor measurement.

In some embodiments, a sensing range of the sensors may match a displacement range of the input lever 114. For example, the sensors may be positioned and designed to be able to sense a full range of movement of the input lever 114 in both the first direction and the second direction in the first and second modes. In other embodiments, the sensors may be positioned and designed to be able to sense only a portion of the movement of the input lever 114 in the first direction and/or the second direction. For example, the sensors may be positioned and designed to sense a threshold amount of the displacement of the input lever 114 in the first direction and/or the second direction, while an extreme portion of the displacement of the input lever 114 in one or both directions may be outside of the sensing range of the sensors. In such embodiments, when movement of the input lever 114 is detected to reach a certain threshold (which may match the maximum sensing range or be some other threshold amount of movement within the sensing range), the input device 100 may send an input signal to an attached computing device associated with the detected movement. Thus, in some embodiments, the input lever 114 may only need to be moved along a portion of the displacement range to trigger an input, however the tactile feedback provided to a user may be based on the input lever 114 being moved to a maximum displacement in a given movement direction.

In some embodiments, input levers of different lengths may be provided, which may enable a user to select an input lever that provides a desired feel. For example, a user may prefer a longer input lever when using the input device in a first mode, and a different length of the input lever when using the input device in a second mode. Additionally, some users may utilize multiple of the input devices at a single time and may want the input lever of each input device to be at a different height. For example, a user may use one input device as a sequential shifter and another input device as a handbrake simultaneously. By having input levers of different lengths, the handles may be used to readily distinguish which input device is in each mode and may also make it easier for a user to grasp each input lever, as the user can grasp at different heights for each input lever. In some embodiments, rather than having multiple input levers of different lengths, the input lever may be operable to telescope to expand and contract a length of the input lever. For example, the handle may be translatable relative to the input lever to adjust a total length of the input lever to position the handle at different heights relative to the housing.

Figure 3:
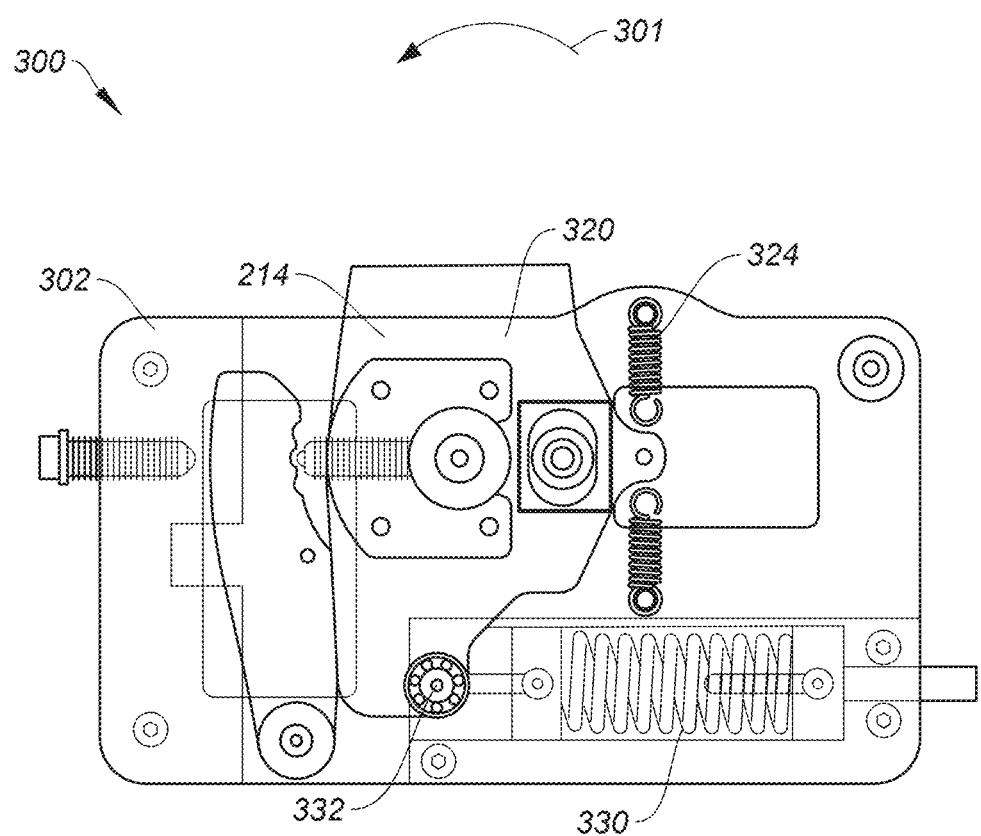
FIG. 3 illustrates a cross-sectional side elevation view of a dual-function input device according to embodiments of the present invention.

As noted above, the embodiments of input devices described above are merely provided as examples and numerous variations exist. For example, the placement and orientation of the springs may be altered. FIG. 3 illustrates an embodiment of an input device 300 that utilizes an alternative spring layout. Input device 300 may be similar to input device 100 and 200 and may include any of the features described in relation to those input devices. Input device 300 may include an actuator 320 disposed within a housing 302. The actuator 320 may be coupled with two springs 324 that are vertically oriented and that operate to return the actuator 320 to a neutral position when no external forces are applied to the actuator 320. The springs 324 may be the only resistance when the actuator 320 operates in the first mode. An additional spring 330 may be coupled with the actuator 320 that may be used to provide resistance against movement of the actuator 320 in a first direction 301 when in the second mode. For example, as the actuator 320 moves in the first direction 301, a protrusion 332 may begin to contact the spring 330 or a component coupled with an end of the spring 330 force the spring 330 to compress, with the compressed spring 330 providing additional resistance to the movement of the actuator 320 in the first direction 301. In the present embodiment, rather than being oriented vertically, the spring 330 may be oriented horizontally within the housing 302. As illustrated, a compression spring 330 may be positioned on a forward side of the actuator 320, however in other embodiments, a tension spring may be used instead, and may be positioned on a rearward side of the actuator 320.

Figure 4:
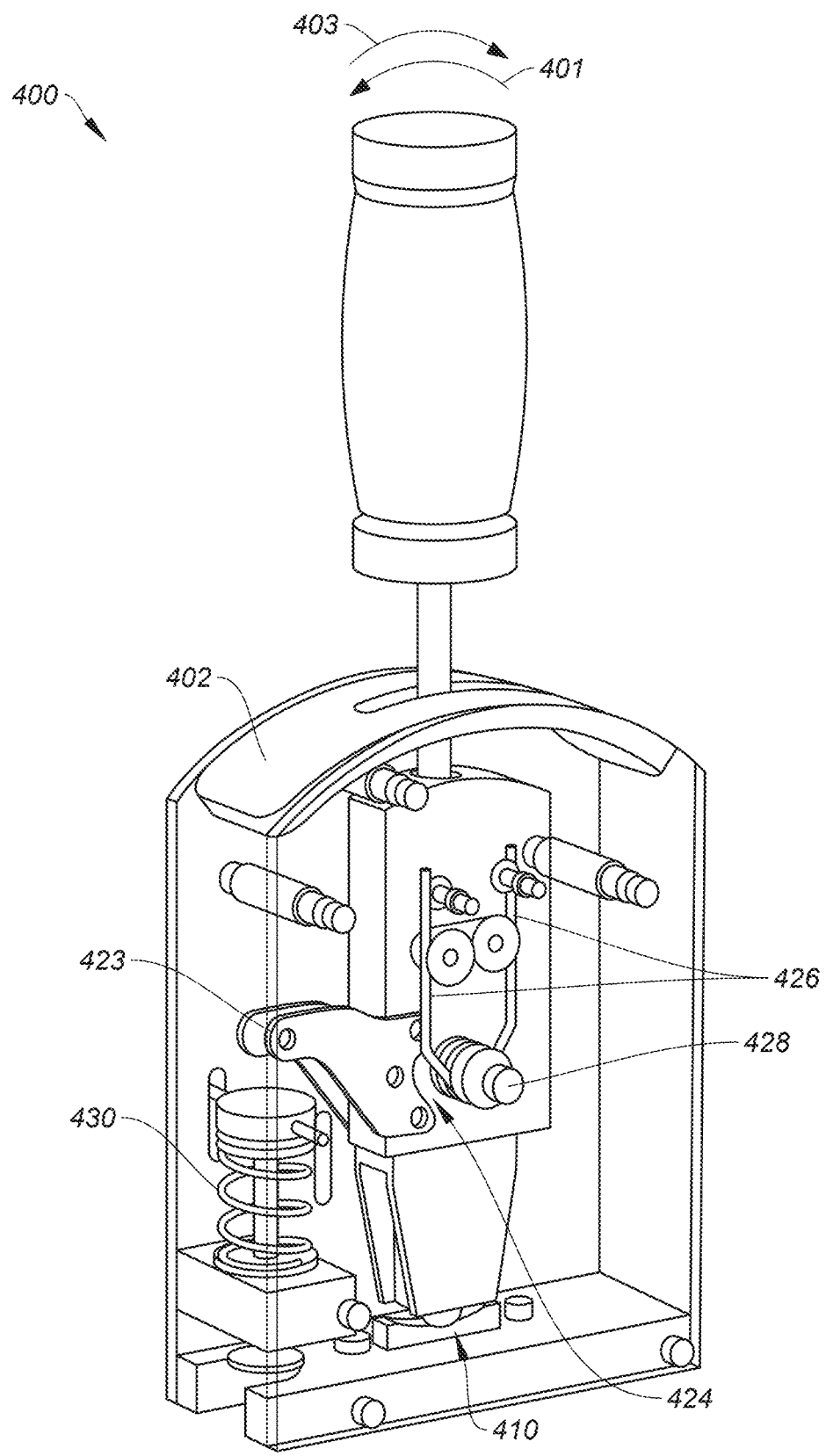
FIG. 4 illustrates a cross-sectional side elevation view of a dual-function input device according to embodiments of the present invention.

FIG. 4 illustrates an embodiment of an input device 400 that utilizes an alternative spring layout. Input device 400 may be similar to input device 100, 200, and 300 and may include any of the features described in relation to those input devices. Input device 400 may include an actuator 420 disposed within a housing 402. The actuator 420 may be coupled with legs 426 of a torsion spring 424 that is positioned about an axle 428 or other pivot point. The torsion spring 424 provides resistance to movement of the actuator 420 in a first direction 401 and a second direction 402. When external forces are removed, the torsion spring 424 returns the actuator 420 to a neutral position as illustrated. An additional spring 430 may be coupled with the actuator 420 that may be used to provide resistance against movement of the actuator 420 in the first direction 401 when in the second mode. For example, as the actuator 420 moves in the first direction 401, a protrusion 432 may begin to contact the spring 430 or a component coupled with an end of the spring 430 force the spring 430 to compress, with the compressed spring 430 providing additional resistance to the movement of the actuator 420 in the first direction 401.

Input device 400 may also include a detent mechanism 440. Detent mechanism 440 may include a detent block that is coupled with a bottom end of the housing 402. The detent block may define an arcuate recess that may receive a biased member, such as a spring-biased ball or pin, that may be coupled with a bottom end of the actuator 420. As the actuator 420 is moved back and forth, the biased member may move within recess and upon reaching an edge of the recess may cause a click or other audible and/or tactile feedback.

Figure 5:
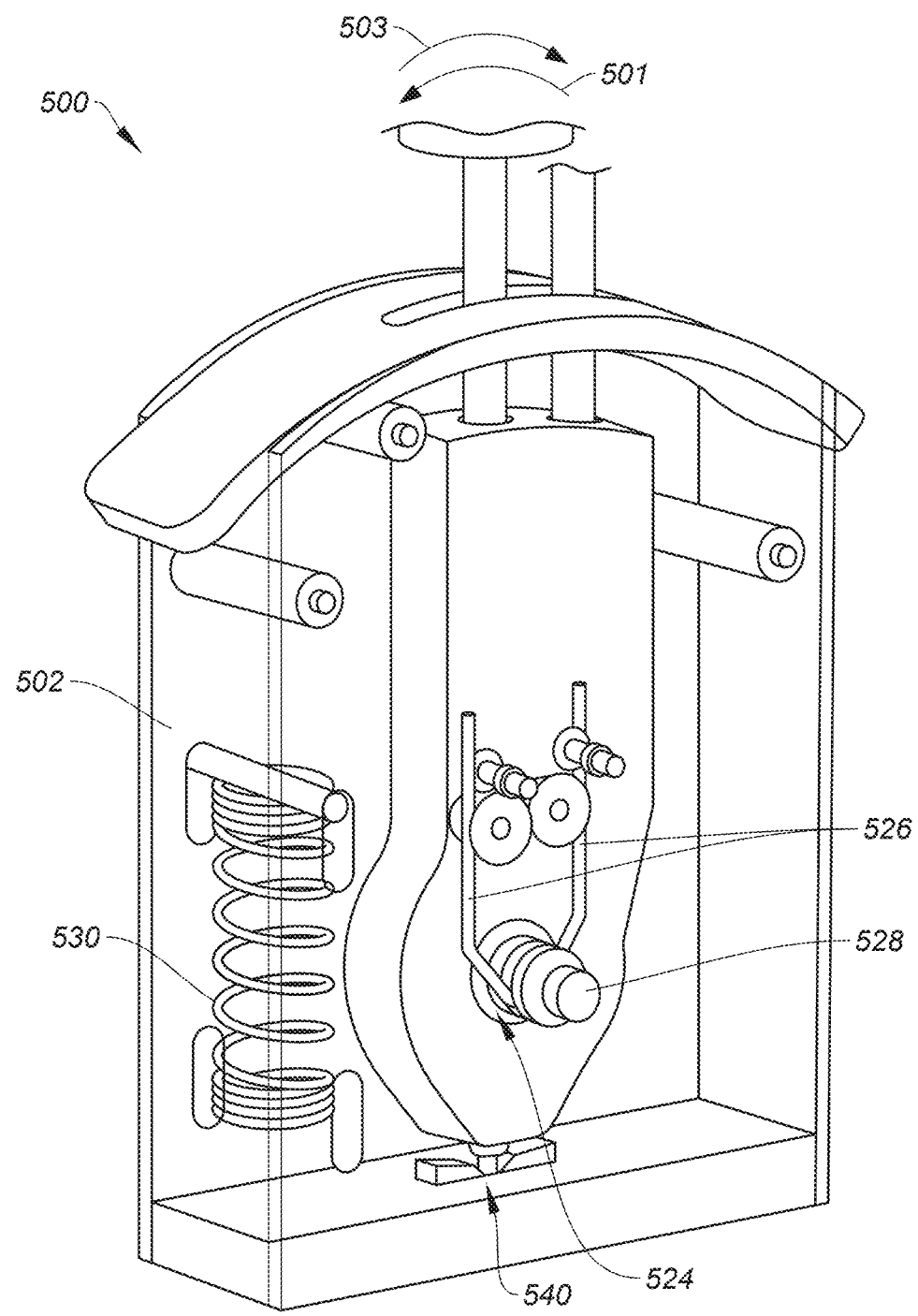
FIG. 5 illustrates a cross-sectional side elevation view of a dual-function input device according to embodiments of the present invention.

FIG. 5 illustrates an embodiment of an input device 500 that utilizes an alternative spring layout. Input device 500 may be similar to input device 100, 200, 300, and 400 and may include any of the features described in relation to those input devices. Input device 500 may include an actuator 520 disposed within a housing 502. The actuator 520 may be coupled with legs 526 of a torsion spring 524 that is positioned about an axle 528 or other pivot point. The torsion spring 524 provides resistance to movement of the actuator 520 in a first direction 501 and a second direction 502. When external forces are removed, the torsion spring 524 returns the actuator 520 to a neutral position as illustrated. An additional spring 530 may be coupled with the actuator 520 that may be used to provide resistance against movement of the actuator 520 in the first direction 501 when in the second mode.

Input device 500 may also include a detent mechanism 540. Detent mechanism 540 may include a detent block that is coupled with a bottom end of the housing 502. The detent block may define an arcuate recess that may receive a biased member, such as a spring-biased ball or pin, that may be coupled with a bottom end of the actuator 520. As the actuator 520 is moved back and forth, the biased member may move within recess and upon reaching an edge of the recess may cause a click or other audible and/or tactile feedback.

Figure 6:
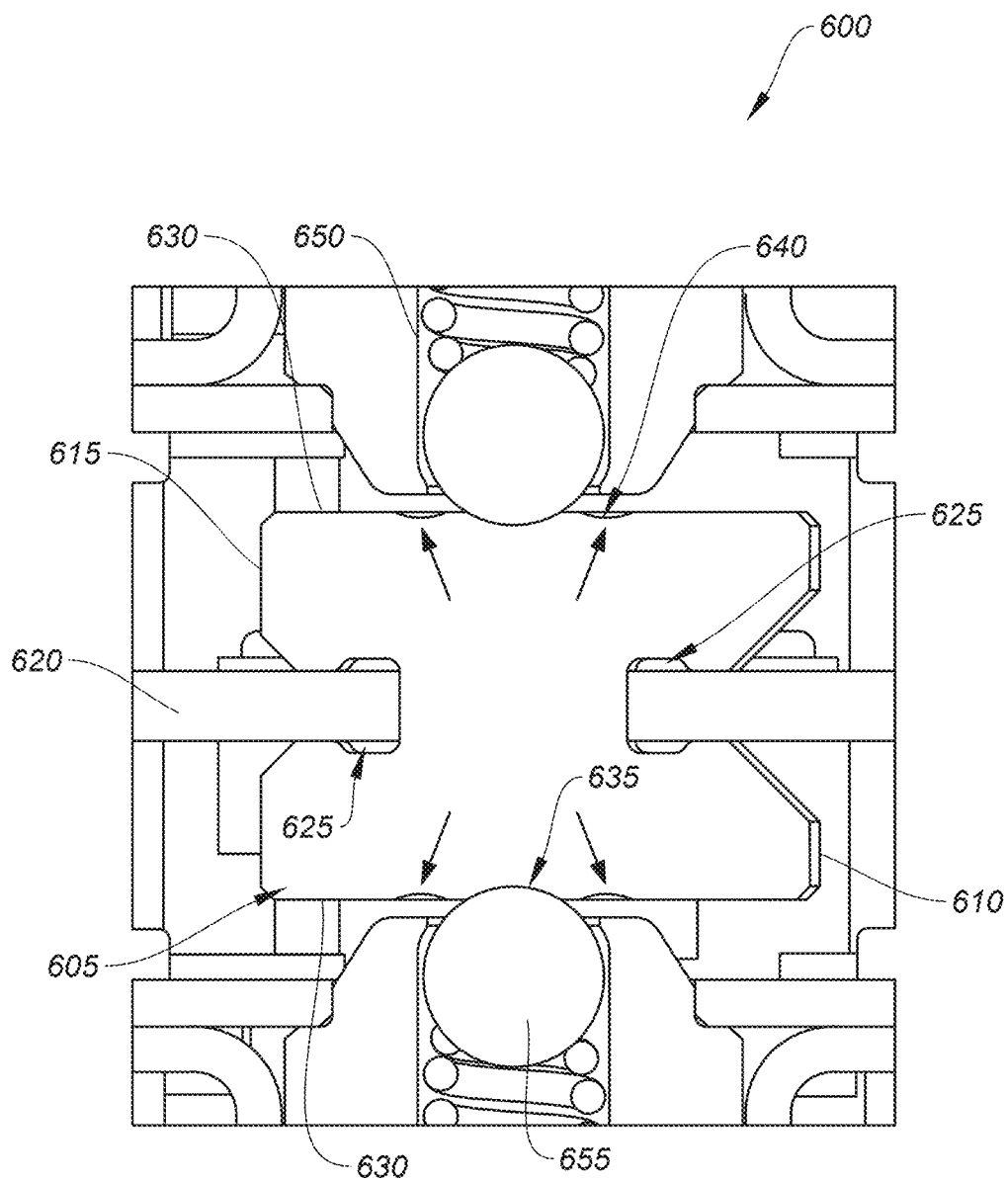
FIG. 6 illustrates a partial cross-sectional top plan view of a detent mechanism according to embodiments of the present invention.
Figure 6A:
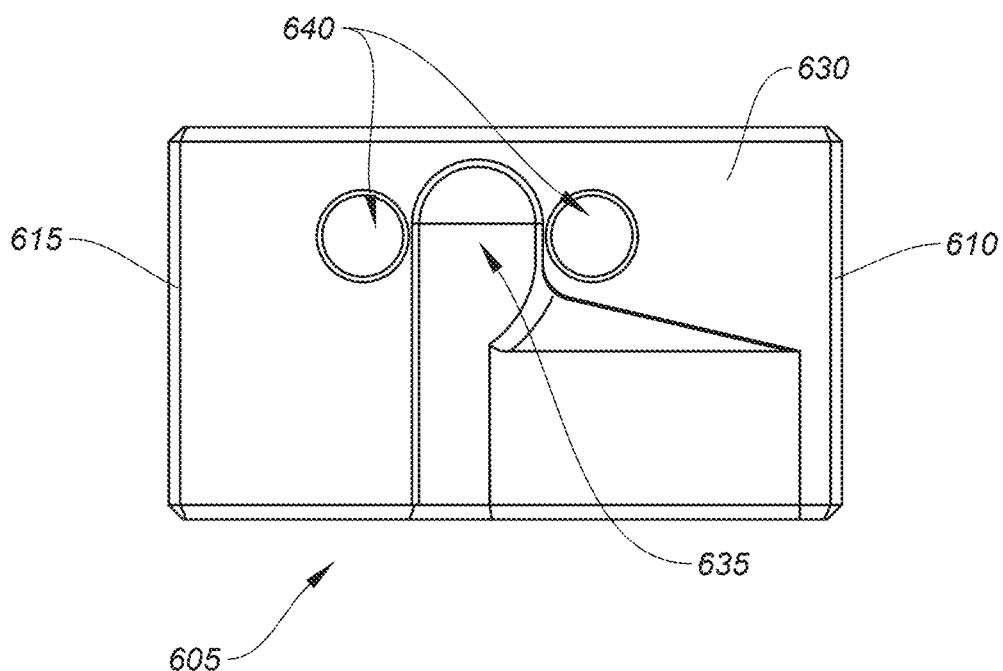
FIG. 6A illustrates a side elevation view of a detent block of the detent mechanism of FIG. 6.

FIGS. 6 and 6A illustrate an embodiment of a detent mechanism 600 that may be used in an input device. For example, detent mechanism 600 may be used as detent mechanism 140, 440, or 540, and may be used in input devices 100, 200, 300, 400, 500, and/or any other input device. Detent mechanism 600 may include a detent block 605 that may be coupled with and/or formed as part of an actuator 620, which may be similar to actuator 120, 220, 320, 420, and/or 520. For example, in the illustrated embodiment, a first end 610 and a second end 615 may each define slots 625 that receive a portion of the actuator 610. For example, the detent block 605 may be positioned within a slot formed in the actuator 620, with each slot 625 receiving a portion of the actuator 620. As best shown in FIG. 6A, each lateral face 630 of the detent block 605 may define a respective recess 635, which may have an arcuate slope along a length (e.g., from the first end 610 to the second end 615) of the detent block 605. Additional dimples 640 or other recesses may be positioned on a front (e.g., in the direction of first end 610) and/or a rear (e.g., in the direction of second end 615) of each recess 635. In some embodiments, each dimple 640 may be semispherical, although other dimple shapes may be used, such as other shapes that have an arcuate profile along a length of the detent block 605. Each dimple 640 may be positioned proximate an edge of the recess 635, such as within 5 mm, within 4 mm, within 3 mm, within 2 mm, within 1 mm, within 0.5 mm, or less of an edge of the recess 635. In some embodiments, each dimple 640 may be shallower than the recess 635.

The detent mechanism 600 may include biased members 650, such as a spring-loaded balls, that may be engaged within each recess 635, with one biased member 650 facing each lateral face 530 in some embodiments. For example, each recess 635 may be oriented vertically with the arcuate shape extending from a front of the detent block 605 to a rear of the detent block 605. Each biased member 650 may extend laterally toward the detent block 605. For example, a spring may bias a ball or other member toward a lateral face 630 of the actuator 620 and toward a base of the arc of recess 635. Each biased member 650 may always be aligned with and engaged with a respective recess 635, or the biased member 650 may only be aligned and engaged with a respective recess 635 during a specific mode of operation of the input device such as described above in relation to input device 100.

The detent mechanism 600 may be used to provide tactile feedback to the user when the user has moved an input lever and actuator of an input device a sufficient distance to perform a desired function. For example, in the first mode of operation, the input device may operate as a sequential shifter for a vehicle in which movements of the input lever and actuator in a first direction are used to downshift to a lower gear while movements of the input lever and actuator in a second direction are used to upshift to a higher gear. The interaction between each biased member 650 and the respective recess 635 may produce a tactile response. For example, when the actuator 620 is in the neutral position in the first mode, a ball 655 or other engagement mechanism of each biased member 650 may be disposed within a center or apex of the respective recess 635. As the actuator 620 is moved in the first direction and the second direction (relative to a neutral position), each ball 655 is moved along the arc of the respective recess 635 until the ball 655 reaches the edge of the recess 635. As each ball 655 passes beyond the edge of the recess 635, the ball 655 may drop into the nearby dimple 640, which may generate a snap or other abrupt change that causes a tactile and/or audible response, such as a clicking or snapping feel to the user. Each recess 635, dimple 640, and ball 655 may be sized, shaped, and positioned such that this feedback occurs when the user has moved the actuator 620 a sufficient distance for sensors of the input device 100 to register an input (such as an upward or downward gear shift) and/or proximate (e.g., within 20%, within 15%, within 10%, within 5%, within 1%, etc.) a maximum displacement range of the input lever and actuator 620.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of 20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of 20% or +10%, +5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A dual-function input device for a computing device, comprising:
   a housing;
   an actuator disposed within the housing, the actuator being pivotable relative to the housing in a first direction and a second direction, the actuator comprising a first connector and a second connector;
   an input lever that is coupleable with the actuator via one of the first connector and the second connector, wherein:
      the actuator is configurable between a first mode by coupling the input lever with the first connector and a second mode by coupling the input lever with the second connector;
      in the first mode the input lever and the actuator are pivotable in the first direction by a first distance; and
      in the second mode the input lever and the actuator are pivotable in the first direction by a second distance that is greater than the first distance.

2. The dual-function input device for a computing device of claim 1, wherein:
   the actuator is configurable between the first mode and the second mode without use of tools.

3. The dual-function input device for a computing device of claim 1, wherein:
   in the first mode, the input lever and the actuator are pivotable in the second direction.

4. The dual-function input device for a computing device of claim 1, wherein:
   in the first mode, the actuator is biased to return to a neutral position when no external forces are applied to the input lever in the first direction or the second direction.

5. The dual-function input device for a computing device of claim 1, wherein:
   in the second mode, the actuator is biased toward the second direction by a spring; and
   a spring force of the spring is variable such that the spring force increases as a displacement of the actuator in the first direction increases.

6. The dual-function input device for a computing device of claim 1, wherein:
   in the first mode the actuator operates as a sequential shifter and in the second mode the actuator operates as a handbrake.

7. The dual-function input device for a computing device of claim 1, further comprising:
   a detent mechanism that is engaged when the actuator is in the first mode and that is disengaged when the actuator is in the second mode.

8. A dual-function input device for a computing device, comprising:
   a housing;
   an actuator disposed within the housing, the actuator being pivotable relative to the housing in a first direction and a second direction, the actuator comprising a first threaded receptacle and a second threaded receptacle;
   an input lever that is coupleable with the actuator via one of the first threaded receptacle and the second threaded receptacle, wherein:
      the actuator is configurable between a first mode by engaging the input lever with the first threaded receptacle and a second mode by engaging the input lever with the second threaded receptacle;
      in the first mode the input lever and the actuator are pivotable in the first direction by a first distance; and
      in the second mode the input lever and the actuator are pivotable in the first direction by a second distance that is greater than the first distance.

9. The dual-function input device for a computing device of claim 8, further comprising:
   a detent mechanism that is engaged when the actuator is in the first mode.

10. The dual-function input device for a computing device of claim 9, wherein:
    the detent mechanism comprises:
       a spring-loaded ball; and
       a detent block that defines a recess that is engageable with the spring-loaded ball.

11. The dual-function input device for a computing device of claim 10, wherein:
    the detent block is translatable relative to the housing such that insertion of the input lever into the first threaded receptacle forces the recess into engagement with the spring-loaded ball.

12. The dual-function input device for a computing device of claim 8, further comprising:
    at least one spring that biases the actuator to return to a neutral position when no external forces are applied to the input lever in the first direction or the second direction when in the first mode.

13. The dual-function input device for a computing device of claim 12, wherein:
    the at least one spring comprises a first spring and a second spring; and
    a spring force of the first spring and a spring force of the second spring are substantially equal.

14. The dual-function input device for a computing device of claim 12, further comprising:

an additional spring that biases the actuator toward the second direction when in the second mode.

15. A dual-function input device for a computing device, comprising:
   a housing, a top surface of the housing defining a slot;
   an actuator disposed within the housing, the actuator being pivotable relative to the housing in a first direction and a second direction, the actuator comprising a first threaded receptacle and a second threaded receptacle;
   an input lever that is coupleable with the actuator via one of the first threaded receptacle and the second threaded receptacle, wherein:
      the first threaded receptacle and the second threaded receptacle are aligned along a length of the slot;
      the actuator is configurable between a first mode by engaging the input lever with the first threaded receptacle and a second mode by engaging the input lever with the second threaded receptacle;
      in the first mode the input lever and the actuator are pivotable in the first direction by a first distance;
      in the second mode the input lever and the actuator are pivotable in the first direction by a second distance that is greater than the first distance; and
      when the input lever is engaged with the first threaded receptacle or the second threaded receptacle, a portion of the input lever extends through the slot.

16. The dual-function input device for a computing device of claim 15, wherein:
   in the first mode a maximum displacement of the actuator in each the first direction and the second direction is substantially equal.

17. The dual-function input device for a computing device of claim 15, wherein:
   in the second mode, the actuator is biased toward the second direction by a spring; and
   a magnitude of a spring force of the spring is adjustable.

18. The dual-function input device for a computing device of claim 17, further comprising:
   a knob coupled with the housing, wherein rotation of the knob causes a corresponding adjustment to the magnitude of the spring force.

19. The dual-function input device for a computing device of claim 15, wherein:
   in the first mode a maximum displacement of the actuator in each the first direction and the second direction is between 5 and 20 degrees.

20. The dual-function input device for a computing device of claim 15, wherein:
   in the second mode a maximum displacement of the actuator in the first direction is between 10 and 30 degrees.

* * * * *